United States Patent
Kuniyasu et al.

(10) Patent No.: US 11,306,900 B2
(45) Date of Patent: Apr. 19, 2022

(54) PLANT GROWTH LIGHTING FIXTURE

(71) Applicant: FUJIFILM Corporation, Tokyo (JP)

(72) Inventors: Satoshi Kuniyasu, Minamiashigara (JP); Ryosuke Shimizu, Minamiashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/220,060

(22) Filed: Apr. 1, 2021

(65) Prior Publication Data
US 2021/0215322 A1   Jul. 15, 2021

Related U.S. Application Data

(63) Continuation of application No. PCT/JP2019/044480, filed on Nov. 13, 2019.

(30) Foreign Application Priority Data

Dec. 14, 2018   (JP) .............................. JP2018-234528

(51) Int. Cl.
*F21V 17/00* (2006.01)
*A01G 7/04* (2006.01)
(Continued)

(52) U.S. Cl.
CPC ............ *F21V 17/002* (2013.01); *A01G 7/045* (2013.01); *F21V 9/14* (2013.01); *F21Y 2115/10* (2016.08)

(58) Field of Classification Search
CPC .......... F21V 17/002; F21V 9/14; A01G 7/045; F21Y 2115/10; G02B 5/30
See application file for complete search history.

(56) References Cited

U.S. PATENT DOCUMENTS

2009/0052182 A1\* 2/2009 Matsuba ................. F21V 13/02
                                                                   362/268
2012/0162960 A1   6/2012 Lin et al.
(Continued)

FOREIGN PATENT DOCUMENTS

JP   2008-228688 A   10/2008
JP   2010-193824 A    9/2010
(Continued)

OTHER PUBLICATIONS

International Preliminary Report on Patentability with Translation of the Written Opinion dated Jun. 8, 2021 in International Application No. PCT/JP2019/044480.
(Continued)

*Primary Examiner* — Evan P Dzierzynski
(74) *Attorney, Agent, or Firm* — Sughrue Mion, PLLC

(57) ABSTRACT

A plant growth lighting fixture includes a lighting fixture main body having a light exit surface, a light source held on the lighting fixture main body, and a reflective-type circularly polarizing plate that selectively reflects circularly polarized light having a particular rotational direction in a particular wavelength range. The reflective-type circularly polarizing plate has a support and a circularly polarized light reflecting layer held on the support. The lighting fixture main body has a holding mechanism for detachably mounting the reflective-type circularly polarizing plate with a main surface of the reflective-type circularly polarizing plate facing the light exit surface.

12 Claims, 4 Drawing Sheets

(51) Int. Cl.
  *F21V 9/14* (2006.01)
  *F21Y 115/10* (2016.01)

(56) References Cited

U.S. PATENT DOCUMENTS

| | | | |
|---|---|---|---|
| 2012/0327510 A1* | 12/2012 | Chiba | C09J 7/385 |
| | | | 359/483.01 |
| 2014/0041296 A1 | 2/2014 | Ichihashi et al. | |
| 2015/0075069 A1 | 3/2015 | Ichihashi et al. | |
| 2017/0324067 A1* | 11/2017 | Hirakata | G02F 1/133502 |
| 2018/0292709 A1* | 10/2018 | Takada | G02F 1/13363 |
| 2019/0174682 A1 | 6/2019 | Usami et al. | |
| 2020/0411734 A1* | 12/2020 | Katou | H01L 33/60 |

FOREIGN PATENT DOCUMENTS

| | | |
|---|---|---|
| JP | 2012-226229 A | 11/2012 |
| JP | 2013-243971 A | 12/2013 |
| JP | 2018-116857 A | 7/2018 |
| WO | 2018/034154 A1 | 2/2018 |

OTHER PUBLICATIONS

Written Opinion of the International Searching Authority dated Feb. 10, 2020 in International Application No. PCT/JP2019/044480.
International Search Report dated Feb. 10, 2020 in International Application No. PCT/JP2019/044480.

* cited by examiner

PLANT GROWTH LIGHTING FIXTURE

CROSS-REFERENCE TO RELATED APPLICATIONS

This application is a Continuation of PCT International Application No. PCT/JP2019/044480 filed on Nov. 13, 2019, which claims priority under 35 U.S.C § 119(a) to Japanese Patent Application No. 2018-234528 filed on Dec. 14, 2018. Each of the above application(s) is hereby expressly incorporated by reference, in its entirety, into the present application.

BACKGROUND OF THE INVENTION

1. Field of the Invention

The present invention relates to plant growth lighting fixture for promoting plant growth.

2. Description of the Related Art

In a plant factory, which is a system whose internal environment is controlled for planned plant production in a closed or semi-closed space, plant growth is controlled by regulating conditions such as temperature, fertilizer, light irradiation time, and illuminance of irradiation light.

It is thought that the polarization state of light may have a certain effect on, for example, plant growth. For example, JP2008-228688A discloses a biological behavior control apparatus including a polarized light irradiation mechanism. This publication discloses that, in an experiment using this apparatus, irradiation with red right-handed circularly polarized light alone promoted the growth of Arabidopsis thaliana.

As such a plant growth lighting fixture for the promotion of plant growth by irradiation with particular circularly polarized light, a plant growth lighting fixture (illumination apparatus for plant growth) disclosed in JP2012-226229A is known.

This plant growth lighting fixture includes a light source and a polarization state control member that controls the polarization state of light emitted from the light source. The plant growth lighting fixture is configured to convert the polarization state in a certain wavelength range of the light emitted from the light source into circularly polarized light so that, of the irradiation light, light in an effective wavelength range (a control wavelength range) has a degree of circular polarization of 0.3 or more. In JP2012-226229A, a reflective-type circularly polarizing plate that selectively reflects circularly polarized light having a particular rotational direction in a particular wavelength range is given as an example of the polarization state controlling member.

SUMMARY OF THE INVENTION

The plant growth lighting fixture disclosed in JP2012-226229A, which is a plant growth lighting fixture for the promotion of plant growth, requires fewer components for polarization state control.

To promote plant growth, it is advantageous that the irradiation light have a higher degree of circular polarization in a wavelength range where plant growth can be promoted. The plant growth lighting fixture disclosed in JP2012-226229A can suitably promote plant growth because the degree of circular polarization in the effective wavelength range is 0.3 or more.

Here, plant growth lighting fixtures of the related art, such as the plant growth lighting fixture disclosed in JP2012-226229A, are usable only for plants whose growth can be promoted with circularly polarized light having a particular rotational direction in a particular wavelength range, such as plants whose growth can be promoted when irradiated with red right-handed circularly polarized light.

In the case of, for example, a plant growth lighting fixture that radiates red right-handed circularly polarized light, the growth of plants whose growth is promoted by irradiation with red left-handed circularly polarized light cannot be promoted.

Plant growth lighting fixtures, as shown in, for example, JP2012-226229A, have a light source and a reflective-type circularly polarizing plate for radiating circularly polarized light having a particular rotational direction.

As the light source, an LED (light emitting diode) is suitable for use.

Examples of the reflective-type circularly polarizing plate include a reflective-type circularly polarizing plate having a reflective-type linear polarizing plate and a λ/4 plate and a reflective-type circularly polarizing plate having a cholesteric liquid crystal layer formed by fixing a cholesteric liquid crystalline phase. Such a reflective-type circularly polarizing plate is formed using, for example, a resin.

LEDs have a long operating life. Thus, a reflective-type circularly polarizing plate formed of, for example, a resin deteriorates faster than an LED.

However, when a reflective-type circularly polarizing plate alone is deteriorated in a plant growth lighting fixture of the related art, the entire plant growth lighting fixture, including a light source such as an LED, needs to be replaced.

An object of the present invention is to solve the foregoing problems of the related art, that is, to provide a plant growth lighting fixture that promotes plant growth, the plant growth lighting fixture being usable for the growth promotion of plants that are irradiated with different types of circularly polarized light for growth promotion and, furthermore, allowing a reflective-type circularly polarizing plate alone to be replaced when the reflective-type circularly polarizing plate is deteriorated.

To achieve the above object, the present invention has the following configuration.

[1] A plant growth lighting fixture includes a lighting fixture main body having a light exit surface, a light source held on the lighting fixture main body, and a reflective-type circularly polarizing plate that selectively reflects circularly polarized light having a particular rotational direction in a particular wavelength range.

The reflective-type circularly polarizing plate has a support circularly polarized light reflecting layer held on the support.

The lighting fixture main body has a holding mechanism for detachably mounting the reflective-type circularly polarizing plate with a main surface of the reflective-type circularly polarizing plate facing the light exit surface.

[2] In the plant growth lighting fixture according to [1], the holding mechanism has grooves that accommodate two opposite end portions of the reflective-type circularly polarizing plate, and the reflective-type circularly polarizing plate is detachably mounted by inserting the two opposite end portions of the reflective-type circularly polarizing plate into the grooves.

[3] In the plant growth lighting fixture according to [1] or [2], the support has an in-plane retardation Re (550) of 50 nm or less.

[4] In the plant growth lighting fixture according to any one of [1] to [3], the circularly polarized light reflecting layer has a cholesteric liquid crystal layer formed by fixing a cholesteric liquid crystalline phase.

[5] In the plant growth lighting fixture according to any one of [1] to [4], in a state where the holding mechanism holds the reflective-type circularly polarizing plate, a space is left between the light exit surface of the lighting fixture main body and the reflective-type circularly polarizing plate.

[6] In the plant growth lighting fixture according to any one of [1] to [5], the light source includes a plurality of light sources arranged in a single direction.

[7] In the plant growth lighting fixture according to any one of [1] to [6], a long side of a minimum rectangle including the main surface of the reflective-type circularly polarizing plate has a length of [1] to [2] m.

[8] In the plant growth lighting fixture according to any one of [1] to [7], the support of the reflective-type circularly polarizing plate has a thickness of 0.1 to 5 mm.

[9] In the plant growth lighting fixture according to any one of [1] to [8], the reflective-type circularly polarizing plate has a center wavelength of the particular wavelength range, in which circularly polarized light having a particular rotational direction is selectively reflected, in at least one of a wavelength range of 380 to 500 nm or a wavelength range of 600 to 780 nm.

[10] In the plant growth lighting fixture according to any one of [1] to [9], the light source is at least one of a light source having an emission center wavelength in a wavelength range of 380 to 500 nm, a light source having an emission center wavelength in a wavelength range of 600 to 780 nm, or a white light source.

[11] In the plant growth lighting fixture according to any one of [1] to [10], the light source is an LED.

[12] In the plant growth lighting fixture according to any one of [1] to [11], the holding mechanism is an elongated holding member having an L-shaped sectional shape.

[13] In the plant growth lighting fixture according to [3], the plant growth lighting fixture includes the light source, the circularly polarized light reflecting layer, and the support, in this order.

The plant growth lighting fixture according to the present invention is used for a plant whose growth can be promoted by irradiation with particular circularly polarized light in a particular wavelength range. The plant growth lighting fixture is usable for the growth promotion of plants that are irradiated with different types of circularly polarized light for growth promotion and, furthermore, allows a reflective-type circularly polarizing plate alone to be replaced when the reflective-type circularly polarizing plate is deteriorated.

DESCRIPTION OF THE PREFERRED EMBODIMENTS

Figure 1:
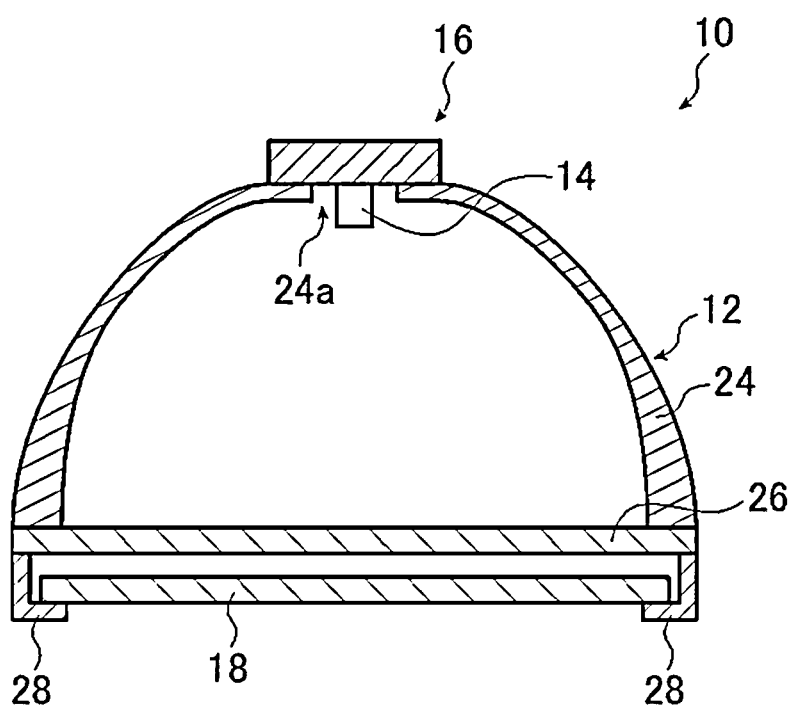
FIG. 1 is a sectional view conceptually illustrating an example of a plant growth lighting fixture according to the present invention.

Hereinafter, a plant growth lighting fixture according to the present invention will be described in detail on the basis of preferred examples illustrated in the accompanying drawings.

In the present invention, a numerical range expressed using "to" means a range including numerical values before and after "to" as the lower and upper limits.

In the present invention, blue light means light in a wavelength range of 380 to 500 urn, green light means light in a wavelength range of more than 500 nm and less than 600 nm, and red light means light in a wavelength range of 600 to 780 mm.

Therefore, visible light means light in a wavelength range of 380 to 780 nm, ultraviolet light means light with a wavelength of less than 380 nm, and infrared light means light with a wavelength of more than 780 nm.

In the present invention, Re ($\lambda$) represents an in-plane retardation at a wavelength $\lambda$. Unless otherwise specified, the wavelength $\lambda$ is 550 nm.

In the present invention, Re ($\lambda$) is a value measured at a wavelength $\lambda$ with an AxoScan polarization phase difference analyzer manufactured by Axometrics. By inputting an average refractive index ($(nx+ny+nz)/3$) and a thickness (d ($\mu$m)) into AxoScan, a slow axis direction (°) and Re ($\lambda$)=R0($\lambda$) are calculated.

R0($\lambda$), which is indicated as a value calculated by AxoScan, means Re ($\lambda$).

In the present invention, refractive indices nx, ny, and nz are measured with an Abbe refractive refractometer (NAR-4T manufactured by ATAGO CO., LTD.) using a sodium lamp ($\lambda$=589 nm) as a light source. When a wavelength dependence is measured, it can be measured with a DR-M2 multi-wavelength Abbe refractometer (manufactured by ATAGO CO., LTD.) using a dichroic filter in combination.

Values in Polymer Handbook (JOHN WILEY &SONS, INC.) and various optical film catalogs can be used. For example, average refractive index values of main optical films are as follows: cellulose acylate (1.48), cycloolefin polymer (1.52), polycarbonate (1.59), polymethyl methacrylate (1.49), and polystyrene (1.59).

Figure 2:
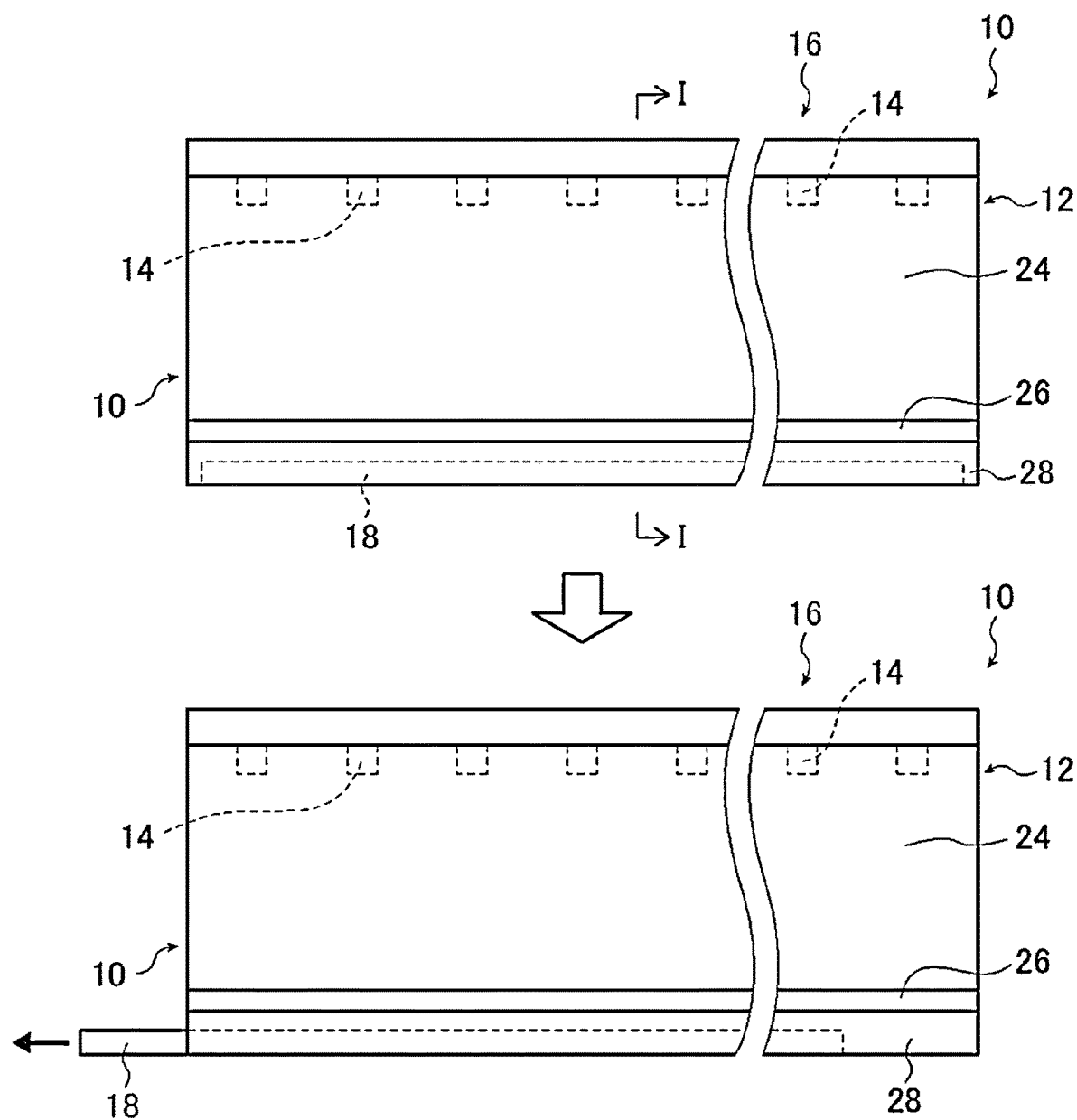
FIG. 2 is a conceptual illustration of the plant growth lighting fixture illustrated in FIG. 1 as viewed from another direction.

FIG. 1 and FIG. 2 conceptually illustrate an example of the plant growth lighting fixture according to the present invention.

FIG. 1 conceptually illustrates a section taken perpendicular to the longitudinal direction of a plant growth lighting fixture 10 according to the present invention. FIG. 2 is a conceptual illustration of the plant growth lighting fixture 10 according to the present invention as viewed from the transverse direction, that is, the direction perpendicular to FIG. 1. That is to say, FIG. 1 is a sectional view taken along line I-I of the upper figure of FIG. 2.

The plant growth lighting fixture 10 shown in the illustrated example is an apparatus for irradiating a plant with circularly polarized light (light with circular polarization) having a particular rotational direction in a particular wavelength range (wavelength region), the circularly polarized light being capable of promoting plant growth. The plant growth lighting fixture 10 has a lighting fixture main body 12, a light source unit 16 having a light source 14, and a reflective-type circularly polarizing plate 18.

As illustrated in FIG. 2, in the plant growth lighting fixture 10 according to the present invention, the reflective-type circularly polarizing plate 18 is detachably held on the lighting fixture main body 12 with the main surface of the plate facing a light exit surface of the lighting fixture main body 12. In the illustrated example, the light exit surface of the lighting fixture main body 12 is specifically the outer surface of a light-transmitting plate 26 described later. This will be described later in detail.

The main surface refers to the largest surface of a sheet-like material (plate-like material or film).

In addition to the members illustrated, the plant growth lighting fixture 10 may optionally have various members used for known plant growth lighting fixtures (light irradiation apparatuses), such as reflective members, heat-dissipating members, infrared-absorbing members, ultraviolet-absorbing members, lenses, prisms, and control circuits fir switching on and off the light source 14.

In the plant growth lighting fixture 10 according to the present invention, the reflective-type circularly polarizing plate 18 (circularly polarized light reflecting layer 32) has an effective wavelength range, that is, a selective reflection wavelength range, and selectively reflects right-handed circularly polarized light or left-handed circularly polarized light in the effective wavelength range. Specifically, the reflective-type circularly polarizing plate 18 reflects left-handed circularly polarized light in the effective wavelength range and transmits all the other light including right-handed circularly polarized light in the effective wavelength range. Alternatively, the reflective-type circularly polarizing plate 18 reflects right-handed circularly polarized light in the effective wavelength range and transmits all the other light including left-handed circularly polarized light in the effective wavelength range.

Thus, of the light transmitted through the reflective-type circularly polarizing plate 18, only the light in the effective wavelength range contains left-handed circularly polarized light or right-handed circularly polarized light. In other words, the light in the effective wavelength range irradiates a plant with right-handed circularly polarized light alone or left-handed circularly polarized light alone.

In the present invention, the light in the effective wavelength range transmitted through the reflective-type circularly polarizing plate 18 is not limited to light consisting only of right-handed circularly polarized light or left-handed circularly polarized light.

That is to say, in the present invention, when the reflective-type circularly polarizing plate 18 reflects left-handed circularly polarized light in the effective wavelength range and transmits right-handed circularly polarized light, the light in the effective wavelength range transmitted through the reflective-type circularly polarizing plate 18 may contain left-handed circularly polarized light. In contrast, when the reflective-type circularly polarizing plate 18 reflects right-handed circularly polarized light in the effective wavelength range and transmits left-handed circularly polarized light, the light in the effective wavelength range transmitted through the reflective-type circularly polarizing plate 18 may contain right-handed circularly polarized light. In either case, in the effective wavelength range, the proportion of a circularly polarized component having a rotational direction that allows transmission through the reflective-type circularly polarizing plate 18 is larger, as a matter of course.

Thus, the plant growth lighting fixture 10 according to the present invention can radiate highly circularly polarized light containing a large proportion of circularly polarized light (circularly polarized component) having a rotational direction that enables the promotion of plant growth in a desired wavelength range that enables the promotion of plant growth, and can suitably promote plant growth.

In other words, the plant growth lighting fixture 10 according to the present invention can irradiate a plant with light containing a large proportion of circularly polarized light having a particular rotational direction that contributes to plant growth in a particular wavelength range that enables the promotion of plant growth.

Here, the polarization state of light can be expressed by the sum of right-handed circularly polarization and left-handed circularly polarization. For example, when the left-handed circularly polarization and the right-handed circularly polarization have the same intensity, the sum is linear polarization, with its electric vector oscillating in the orientation determined by the phase difference between the left-handed circularly polarization and the right-handed circularly polarization. When the right-handed circularly polarization and the left-handed circularly polarization have different intensities, the resulting state is elliptic polarization. When there is only one of the two components, the resulting state is perfect circular polarization.

The rotational direction (sense) of circular polarization, as viewed such that light travels toward the viewer, is right-handed if the head of the electric field vector rotates clockwise with increasing time, and is left-handed if the head of the electric field vector rotates counterclockwise.

The degree of circular polarization is defined as:

$$|I_R - I_L|/(I_R + I_L)$$

where $I_R$ is the intensity of right-handed circularly polarization of light, and $I_L$ is the intensity of left-handed circularly polarization of light. Light having a higher degree of circular polarization contains a higher proportion of right-handed circularly polarized light or left-handed circularly polarized light.

The polarization state of the light emitted from the light source 14 for each wavelength can be measured with a spectroradiometer or spectrometer equipped with a circularly polarizing plate. In this case, the measured intensity of light transmitted through a right-handed circularly polarizing plate corresponds to $I_R$, and the measured intensity of light transmitted through a left-handed circularly polarizing plate corresponds to $I_L$. Normal light sources such as incandescent lamps, mercury lamps, fluorescent lamps, and LEDs emit almost natural light. The polarization characteristics of natural light transmitted through the reflective-type circularly polarizing plate 18 and natural light reflected by the reflective-type circularly polarizing plate 18 can be measured, for example, with AxoScan mentioned above.

Lighting Fixture Main Body

As described above, the plant growth lighting fixture 10 has the lighting fixture main body 12, the light source unit 16 having the light source 14, and the reflective-type circularly polarizing plate 18.

The lighting fixture main body 12 has a housing 24, a light-transmitting plate 26, and holding members 28.

The housing 24 has a substantially arcuate sectional shape and has an opening 24a at the top of the arc. The light source 14 is inserted through the opening 24a, and the light source unit 16 is fixed to the housing 24, that is, the lighting fixture main body 12, from the outside at the top of the arc of the housing 24.

As illustrated in FIG. 2, the plant growth lighting fixture 10, that is, the housing 24 is elongated. Therefore, the housing 24 has a shape of a minor arc obtained by cutting a hollow and substantially columnar (cylindrical) substance in the height direction. In the illustrated example, near the open end of the arc, the housing 24 gradually becomes thicker toward the open end. As illustrated in FIG. 1, when the plant growth lighting fixture 10 in the illustrated example is in a state where the reflective-type circularly polarizing plate 18 described later is mounted to the lighting fixture main body 12, opposite end portions of the reflective-type circularly polarizing plate 18 are located outward from the inner surfaces of the thick end portions of the housing 24.

As described above, FIG. 1 is a section along a direction perpendicular to the longitudinal direction of the plant growth lighting fixture 10 (the height direction of the cylinder) (section along line I-I of FIG. 2). Therefore, in FIG. 1, the housing 24 is elongated in a direction perpendicular to the drawing plane.

The inner surface of the housing 24 is a light reflective surface. That is to say, the housing 24 acts as a reflector in the plant growth lighting fixture 10.

The inner surface of the housing 24 is not limited, and various light reflective surfaces used, for example, in optical instruments can be used. Examples of light reflective surfaces include metal films, white surfaces, and diffuse reflective surfaces. Alternatively, the housing 24 may be firmed of, for example, a metal material, a white material, or a light diffusive material so that the inner surface of the housing 24 is a light reflective surface.

In the illustrated example, the housing 24 has a substantially arcuate sectional shape, but the present invention is not limited to this shape.

The sectional shape of the housing 24 need not be substantially arcuate and may be rectangular, trapezoid, triangular, parabolic, or other various shapes.

The housing 24, that is, the plant growth lighting fixture according to the present invention need not be elongated and may have a planar shape (light exit surface shape) such as a circle, a square, or a triangle. However, in the plant growth lighting fixture according to the present invention, it is preferred that the housing 24 be elongated and a plurality of the light sources 14 be arranged as described below, thereby enabling the promotion of plant growth over a large area.

The longitudinal length of the housing 24, that is, the plant growth lighting fixture 10, is not limited, and in view of, for example, handleability of the plant growth lighting fixture 10 and processing cost, it is preferably 1 to 2 m, more preferably 1 to 1.5 m.

The transverse length of the housing 24, that is, the plant growth lighting fixture 10, is also not limited, and in view of, for example, handleability of the plant growth lighting fixture 10 and processing cost, it is preferably 1 to 20 cm.

As described above, the open side of the housing 24 is closed by the light-transmitting plate 26. Therefore, the light-transmitting plate 26 is elongated as with the housing 24 and has a rectangular shape.

The surface (outer surface) of the light-transmitting plate 26 opposite to the light source 14 serves as the light exit surface of the lighting fixture main body 12 of the plant growth lighting fixture 10.

The light-transmitting plate 26 may be any plate-like material having the same planar shape as the open side of the housing 24, that is, an exit surface (exit port) for light from the housing 24, as long as it can transmit light emitted from the light source 14 at a sufficient transmittance.

The light-transmitting plate 26 need not necessarily have such a shape that the open side of the housing 24 is completely closed. That is to say, the light-transmitting plate 26 may be such that there is a surrounding space between the light-transmitting plate 26 and the housing 24 or may have regular or irregular through-holes.

At opposite transverse end portions of the outer surface of the light-transmitting plate 26, that is, the light exit surface, the holding members 28 are disposed.

The holding members 28 constitute a holding mechanism in the present invention for detachably mounting the reflective-type circularly polarizing plate 18 to the lighting fixture main body 12 with the main surface of the reflective-type circularly polarizing plate 18 facing the light exit surface.

Figure 3:
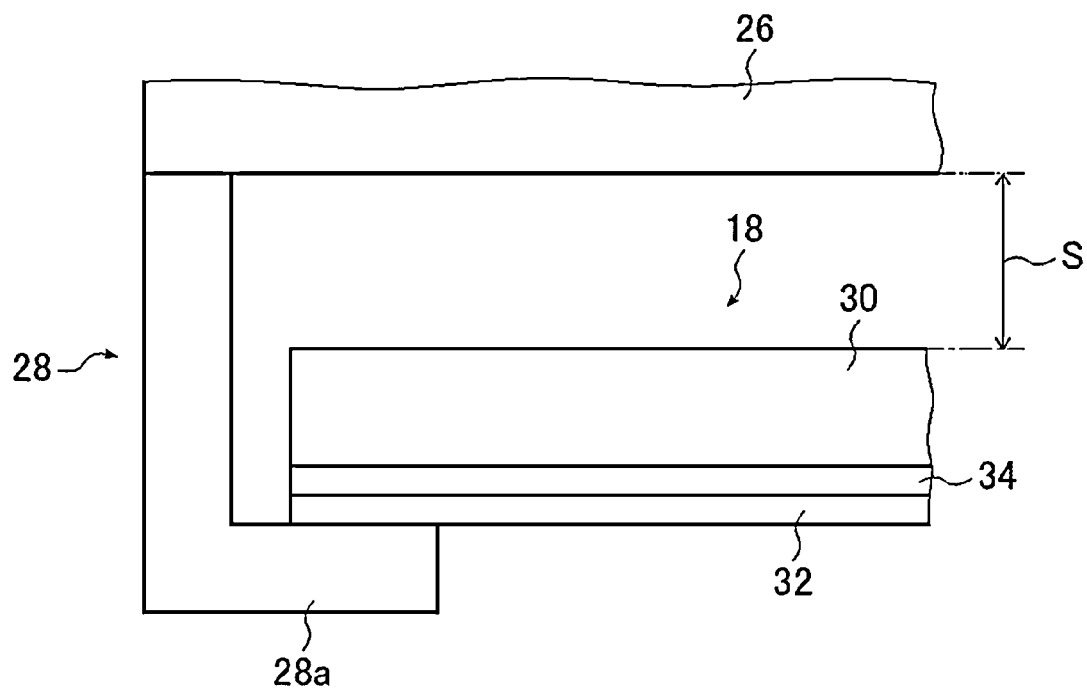
FIG. 3 is a partially enlarged view of FIG. 1.

FIG. 3 shows a partially enlarged view of FIG. 1.

As illustrated in FIG. 1 to FIG. 3, in the plant growth lighting fixture 10 in the illustrated example, the holding members 28 each have such a shape that two elongated flat plates are fixed together perpendicularly at their transverse end portions. That is to say, in the illustrated example, the holding members 28 are each an elongated member having an L-shaped sectional shape. The term "L-shaped" also includes substantially L-shaped.

As illustrated in FIG. 1 to FIG. 3, the holding members 28 are fixed to the lighting fixture main body 12 (the light-transmitting plate 26). The top portion of the L-shape, that is, a tip portion opposite the tip portion of a lower end portion 28a of the L-shape, abuts on an transverse end portion of the light-transmitting plate 26 (light exit surface). The tip of the lower end portion 28a of the bent L-shape faces inward in the transverse direction of the light-transmitting plate 26. The longitudinal direction of the holding members 28 coincides with the longitudinal direction of the light-transmitting plate 26. In this configuration, the light-transmitting plate 26 and the holding members 28 together form grooves (long recesses) which the opposite transverse end portions of the reflective-type circularly polarizing plate 18 described later are placed.

As illustrated in FIG. 1 to FIG. 3, in the plant growth lighting fixture 10, the transverse end portions of the reflective-type circularly polarizing plate 18 are inserted into the grooves formed by the light-transmitting plate 26 and the holding members 28, and the reflective-type circularly polarizing plate 18 is pushed in the longitudinal direction, whereby the reflective-type circularly polarizing plate 18 is mounted and held on the lighting fixture main body 12 such that each transverse end portion is placed on the lower end portion 28a of the L-shape of each holding member 28. On the other hand, the reflective-type circularly polarizing plate 18 is removed from the lighting fixture main body 12 by pulling out the reflective-type circularly polarizing plate 18 in the longitudinal direction.

In this configuration of the plant growth lighting fixture 10 in the illustrated example, the reflective-type circularly polarizing plate 18 is detachably mounted to the lighting fixture main body 12 with the main surface of the reflective-type circularly polarizing plate 18 facing the light exit surface of the light-transmitting plate 26.

The lower end portion 28a, for placing each end portion of the reflective-type circularly polarizing plate 18, of the L-shape of each holding member 28 need not exist throughout the longitudinal direction, and the lower end portion 28a of the L-shape may exist intermittently in the longitudinal direction. In this case, the longitudinal length of the lower end portion 28a of the L-shape and the formation interval may be the same or different. When the lower end portion 28a of the L-shape of each holding member 28 is intermittent, it is preferable to set the interval between lower end portions of the substantially L-shape so that the reflective-type circularly polarizing plate 18 will not bend at regions with no lower ends.

The holding members 28 need not be substantially L-shaped in section, and may be of any shape, such as U-shaped, substantially E-shaped, or substantially V-shaped in section, as long as grooves in which the end portions of the reflective-type circularly polarizing plate 18 are inserted and held can be formed.

The lighting fixture main body 12, the housing 24, the light-transmitting plate 26, and the holding members 28 may be formed of any type of material that has sufficient resistance to light and heat emitted from the light source 14 and has sufficient mechanical strength.

Examples include resin materials such as polycarbonate (PC), polyethylene terephthalate (PET), polypropylene, polyethylene, and acrylic resins.

The housing 24, the light-transmitting plate 26, and the holding members 28 may be formed of the same material. Two of them may be formed of the same material, with the other one being formed of a different material. All the three may be formed of different materials.

When two or more members are formed of the same material, they may be integrally molded. Thus, in the present invention, the housing 24, the light-transmitting plate 26, and the holding members 28 may be integrally molded; the housing 24 and the light-transmitting plate 26 may be integrally molded; the light-transmitting plate 26 and the holding members 28 may be integrally molded; or the housing 24 and the holding members 28 may be integrally molded. If necessary, the light-transmitting plate 26 and the holding members 28 may be formed so as to be detachable from the housing 24 and the light-transmitting plate 26, respectively, by known means.

When one or more of the housing 24, the light-transmitting plate 26, and the holding members 28 are not integrally molded, the members may be fixed to each other by known means such as an adhesive, a fixing jig, fitting of a protrusion into a recess, fastening with a screw, or a bolt and a nut.

Light Source

As described above, the opening 24a is formed at the top of the arc of the housing 24 having a substantially arcuate sectional shape, and the light source 14 is inserted through the opening 24a. The light source unit 16 is fixed from the outside at the top of the arc of the housing 24.

The light source unit 16 is a known light-emitting device having, in addition to the light source 14, a substrate for switching on and controlling the light source 14 and other members and selected according to the type of the light source 14.

The light source unit 16 may be attached to the housing 24 by any method, and various known methods can be used according to, for example, the shape and configuration of the housing 24 and the light source unit 16. The light source unit 16 may be detachably attached to the housing 24.

The light source unit 16 has a plurality of the light sources 14, and each light source 14 may be, but need not be, detachable from the light source unit 16 and replaceable.

The light source 14 is not limited, and any type of light source (light-emitting device) can be used as long as it can emit light with a wavelength at which the growth of a target plant for the plant growth lighting fixture 10 can be controlled.

Examples of light sources include fluorescent lamps such as fluorescent light, LEDs, discharge lamps such as mercury lamps, and halogen lamps, tungsten lamps, laser lights, organic light-emitting diodes (OLEDs), metal halide lamps, and xenon lamps. Of these, LEDs are preferred from the viewpoint of efficiency.

These light sources can be used in combination with filters that reflect or transmit light in a particular wavelength range and/or phosphors that convert wavelength.

In the plant growth lighting fixture 10 according to the present invention, the emission wavelength range of the light source 14 is not limited, and a wavelength that can promote growth may be appropriately selected according to the plant to be cultivated. Thus, the center wavelength of the light source 14 may be, for example, in the visible range or the infrared range.

Here, the growth of many plants is promoted by irradiation with red circularly polarized light or irradiation with blue circularly polarized light. Thus, the light source 14 is preferably, for example, a light source having a center wavelength in a wavelength range of 380 to 500 nm, that is, a red light source that emits red light, or a light source having a center wavelength in a wavelength range of 600 to 780 nm, that is, a blue light source that emits blue light, because, for example, a high plant growth promoting effect can be produced.

The center wavelength of the light source 14, that is, the emission center wavelength of the light source 14, is a wavelength at which the emission of the light source 14 is maximum, that is, a wavelength at the maximum peak of the emission spectral characteristics of the light source 14.

In the plant growth lighting fixture 10 according to the present invention, if only the light in a wavelength range effective for the promotion of plant growth contains right-handed circularly polarized light or left-handed circularly polarized light, the effect of promoting plant growth is produced. Thus, a white light source is also suitable for use as the light source 14.

The white light source is not limited, and various known so-called white light sources, such as fluorescent lamps, mercury lamps, halogen lamps, metal halide lamps, and white LEDs using blue LEDs, green LEDs, and red LEDs can be used.

When a white light source is used as the light source 14, the irradiation efficiency of light in a wavelength range effective for the promotion of plant growth is lower than when a monochromatic light source such as a red light source is used. On the other hand, by selecting an effective wavelength range where right-handed circularly polarized light or left-handed circularly polarized light is selectively reflected in the reflective-type circularly polarizing plate 18 described later, the plant growth lighting fixture 10 can be made usable for the growth promotion of plants using light of every wavelength range (color), such as the growth promotion of plants with red light, the growth promotion of plants with green light, and the growth promotion of plants with blue light.

As will be described later, in the plant growth lighting fixture according to the present invention, the reflective-type circularly polarizing plate 18 is replaceable. Thus, by using a white light source and providing a plurality of types of reflective-type circularly polarizing plates 18 having different effective wavelength ranges, the growth promotion of a wide variety of plants can be achieved.

In the plant growth lighting fixture 10 according to the present invention, even when a light source that emits monochromatic light, such as a red light source or a blue light source, is used as the light source 14 that emits light that promotes plant growth, it is preferable to use a white light source to radiate low-intensity white light for work.

When the plant growth lighting fixture 10 has the white light source in addition to the light source 14 for the promotion of plant growth, the visibility in a work environment of plant cultivation workers can be increased to improve, for example, observability of plants and workability.

When the plant growth lighting fixture 10 according to the present invention radiates white light for work, a white light source as described above may be used, or light sources of different colors may be combined together to produce white light.

For example, when a red light source is used as the light source 14 for growth promotion, a green light source and a blue light source lower in intensity and/or smaller in number than the red light source may be used in combination so that white light for work, which is lower in intensity than red light, is radiated.

In the plant growth lighting fixture 10 in the illustrated example, a plurality of the light sources 14 are arranged along the longitudinal direction of the housing 24 as a preferred embodiment. This configuration enables the promotion of plant growth over a large area.

When a plurality of light sources 14 are arranged, the arrangement of the light sources 14 need not be a linear arrangement and may be a staggered arrangement, a sine-curve arrangement, or any other arrangement. That is to say, when a plurality of the light sources 14 are arranged in the plant growth lighting fixture according to present invention, the light sources 14 may be arranged in any configuration as long as they are arranged in a single direction.

In the plant growth lighting fixture 10, the number and the arrangement interval of the light sources 14 are not limited and may be appropriately set according to, for example, the type, light intensity, and light diffusibility of the light sources 14, the length of the plant growth lighting fixture 10, and the type of plant to be cultivated.

Also when the housing 24 is not elongated, the plant growth lighting fixture according to the present invention may have a plurality of the light sources 14.

Reflective-Type Circularly Polarizing Plate

As described above, the reflective-type circularly polarizing plate 18 reflects right-handed circularly polarized light or left-handed circularly polarized light and transmits the other light in an effective wavelength range. The effective wavelength range is a particular wavelength range where right-handed circularly polarized light or left-handed circularly polarized light is selectively reflected.

Thus, of the light transmitted through the reflective-type circularly polarizing plate 18, only the light with a wavelength in the effective wavelength range contains left-handed circularly polarized light or right-handed circularly polarized light.

As illustrated in FIG. 3, which is a partially enlarged view of FIG. 1, the reflective-type circularly polarizing plate 18 has a support 30, a circularly polarized light reflecting layer 32, and an adhesive layer 34. The circularly polarized light reflecting layer 32 is bonded to the support 30 with the adhesive layer 34 interposed therebetween.

As described above, the reflective-type circularly polarizing plate 18 is detachably held on the lighting fixture main body 12 by insertion of the transverse end portions into the grooves formed by the holding members 28 and the light-transmitting plate 26 and movement in the longitudinal direction.

The reflective-type circularly polarizing plate 18 is preferably disposed so as to cover the entire light exit area of the light-transmitting plate 26.

In the reflective-type circularly polarizing plate 18, the support 30 is a plate member that supports the circularly polarized light reflecting layer 32.

The support 30 may be a plate member made of any type of material that can transmit light emitted from the light source 14 at a sufficient transmittance and can secure necessary rigidity. Examples of materials for forming the support 30 include PET, PC, polyethylene, polypropylene, various acrylic resins, triacetyl cellulose (TAC), cycloolefin polymers (COPs), and cycloolefin copolymers (COCs).

Here, the support 30 preferably has a small in-plane retardation Re for the following reasons.

As will be described later, the circularly polarized light reflecting layer 32 of the reflective-type circularly polarizing plate 18 is a layer where the optical effect of the reflective-type circularly polarizing plate 18 is exhibited, and reflects right-handed circularly polarized light or left-handed circularly polarized light and transmits the other light in the effective wavelength range.

In a state where the reflective-type circularly polarizing plate 18 is mounted with the support 30 facing inward (the lighting fixture main body 12 side), as illustrated in FIG. 3, light emitted from the light source 14 passes through the support 30 and then enters the circularly polarized light reflecting layer 32, where only right-handed circularly polarized light or left-handed circularly polarized light in the effective wavelength range is transmitted. Therefore, the support 30 has no influence on the light transmitted through the circularly polarized light reflecting layer 32.

As described above, the reflective-type circularly polarizing plate 18 detachably held with its end portions inserted into the grooves of the lighting fixture main body 12 can be mounted upside down with respect to the light source 14. That is to say, the plant growth lighting fixture 10 may not only be in the state illustrated in FIG. 3, but the reflective-type circularly polarizing plate 18 may be mounted with the support 30 facing outward (away from the lighting fixture main body 12) so that light emitted from the light source 14 passes through the circularly polarized light reflecting layer 32 and then through the support 30.

In this case, only right-handed circularly polarized light or left-handed circularly polarized light in the effective wavelength range is transmitted through the circularly polarized light reflecting layer 32, and then left-handed circularly polarized light or right-handed circularly polarized light in the effective wavelength range enters and passes through the support 30. Thus, if the support 30 has a large in-plane retardation Re, the state of left-handed circularly polarized light or right-handed circularly polarized light in the effective wavelength range for the promotion of plant growth may change to decrease the degree of circular polarization, thus reducing the plant growth promoting effect.

In view of this, the support 30 of the reflective-type circularly polarizing plate 18 is preferably formed of a material having a small in-plane retardation Re, such as TAC, an acrylic resin, a COC, or a COP.

Specifically, the in-plane retardation Re (550) at 550 nm of the support 30 is preferably 50 nm or less, more preferably 10 nm or less.

The thickness of the support 30 is not limited.

Here, the reflective-type circularly polarizing plate 18 preferably has sufficient rigidity such that the reflective-type circularly polarizing plate 18, when mounted to the lighting fixture main body 12, can maintain its plate-like shape without experiencing bending or the like. Thus, the thickness of the support 30 supporting the reflective-type circularly polarizing plate 18 may be appropriately set, according to, for example, the formation material, to a thickness that can provide the support 30, that is, the reflective-type circularly polarizing plate 18, with sufficient rigidity.

The thickness of the support 30 is preferably 0.1 to 5 mm, more preferably 0.5 to 2.5 When the thickness of the support 30 is 0.1 mm or more, the support 30 having good rigidity can be obtained from various materials. When the thickness of the support 30 is 5 mm or less, benefits such as preventing the reflective-type circularly polarizing plate 18 from becoming unnecessarily thick and preventing the reflective-type circularly polarizing plate 18 from becoming unnecessarily heavy are provided.

The reflective-type circularly polarizing plate 18 has the circularly polarized light reflecting layer 32. The circularly polarized light reflecting layer 32 is bonded to the support 30 with the adhesive layer 34 interposed therebetween.

In the reflective-type circularly polarizing plate 18, the circularly polarized light reflecting layer 32 is a layer where the optical effect of the reflective-type circularly polarizing plate 18 is exhibited.

Thus, the circularly polarized light reflecting layer 32 is a layer that reflects right-handed circularly polarized light or left-handed circularly polarized light and transmits the other light in the effective wavelength range, as described above.

Specifically, the circularly polarized light reflecting layer 32 where the optical effect of the reflective-type circularly polarizing plate 18 is exhibited reflects left-handed circularly polarized light in the effective wavelength range and transmits basically all the other light including right-handed circularly polarized light in the effective wavelength range. Alternatively, the circularly polarized light reflecting layer 32 reflects right-handed circularly polarized light in the effective wavelength range and transmits basically all the other light including left-handed circularly polarized light in the effective wavelength range. The light transmitted through the circularly polarized light reflecting layer 32 excludes inevitably absorbed components.

The circularly polarized light reflecting layer 32 is not limited, and various layers where the above-described effect is exhibited can be used.

Examples include (1) a circularly polarized light reflecting layer 32 having a cholesteric liquid crystal layer and (2) a circularly polarized light reflecting layer 32 formed of a combination of a reflective-type linear polarizing plate and a $\lambda/4$ plate.

(1) Circularly Polarized Light Reflecting Layer Having Cholesteric Liquid Crystal Layer A cholesteric liquid crystal layer is a layer formed by fixing a cholesteric liquid crystalline phase.

In the plant growth lighting fixture 10 according to the present invention, the circularly polarized light reflecting layer 32 of the reflective-type circularly polarizing plate 18 has an effective wavelength range. In the circularly polarized light reflecting layer 32 having a cholesteric liquid crystal layer, the cholesteric liquid crystal layer has the effective wavelength range. That is to say, the cholesteric liquid crystal layer of the circularly polarized light reflecting layer 32 exhibits selective reflection properties of reflecting particular circularly polarized light in the effective wavelength range.

Examples of liquid crystalline phases that exhibit selective reflection in the effective wavelength range include cholesteric liquid crystalline phases and chiral smectic liquid crystalline phases, both of which have a helical structure. A liquid crystal material that exhibits a cholesteric liquid crystalline phase or a chiral smectic liquid crystalline phase can be formed by mixing an achiral liquid crystal compound with a chiral agent. Alternatively, such a liquid crystal material can also be obtained by copolymerizing these compounds into a polymer liquid crystal or a polymer film.

The selective reflection properties of the cholesteric liquid crystal layer, that is, the effective-wavelength-range center wavelength $\lambda$, depend on the pitch length P (=helical period) of the helical structure of the cholesteric or chiral smectic phase and follows the relationship $\lambda = n \times P$, where n is the average refractive index of the cholesteric liquid crystalline phase. Thus, the effective-wavelength-range center wavelength $\lambda$ can be adjusted by adjusting the pitch length P of the helical structure of the cholesteric liquid crystalline phase. Since the pitch length P depends on the type and/or concentration of the chiral agent added to the liquid crystal composition, these can be adjusted to achieve the desired pitch length P.

The half-width $\Delta\lambda$ (i.e., the half transmittance $T_{1/2}$) of the effective wavelength range depends on the birefringence $\Delta n$ of the liquid crystal compound and the pitch length P of the helical structure and follows the relationship $\Delta\lambda = \Delta n \times P$. Thus, the width of the effective wavelength range can be controlled by adjusting $\Delta n$. The adjustment of $\Delta n$ can be performed by adjusting the type of liquid crystal and its mixing ratio or controlling the temperature during alignment fixation. Alternative techniques for increasing the width of the effective wavelength range include stacking two or more cholesteric liquid crystal layers such that the pitch lengths P thereof are shifted from each other and varying the pitch in the thickness direction of the cholesteric liquid crystal layer.

In the case of the circularly polarized light reflecting layer 32 having a cholesteric liquid crystal layer, the wavelength range where the cholesteric liquid crystal layer exhibits such selective reflection (selective reflection properties) is the effective wavelength range.

The circularly polarized light selective reflection of the cholesteric liquid crystal layer depends on the twisted direction (sense) of the helix of the cholesteric liquid crystalline phase. That is to say, when the twisted direction of the helix of the cholesteric liquid crystalline phase is right-handed, the cholesteric liquid crystal layer reflects right-handed circularly polarized light and transmits left-handed circularly polarized light in the effective wavelength range. In contrast, when the twisted direction of the helix of the cholesteric liquid crystalline phase is left-handed, the cholesteric liquid crystal layer reflects left-handed circularly polarized light and transmits right-handed circularly polarized light in the effective wavelength range.

Thus, when irradiation is performed with left-handed circularly polarized light and not with right-handed circularly polarized light in the effective wavelength range, that is, the wavelength range where plant growth is promoted, a cholesteric liquid crystal layer having a right-twisted helix is used for the circularly polarized light reflecting layer 32. When irradiation is performed with right-handed circularly polarized light and not with left-handed circularly polarized light, a cholesteric liquid crystal layer having a left-twisted helix is used for the reflective-type circularly polarizing plate 18.

The twisted direction of the helix of the cholesteric liquid crystalline phase can be adjusted by the type of liquid crystal compound forming the cholesteric liquid crystal layer and/or the type of chiral agent added.

Hereinafter, constituent materials of the cholesteric liquid crystal layer and a method for forming the cholesteric liquid crystal layer will be described.

The cholesteric liquid crystal layer formed by fixing a cholesteric liquid crystalline phase can be formed using a cholesteric liquid crystal composition prepared by dissolving (dispersing), in a solvent, a liquid crystal compound, a chiral agent, other additives that are optionally added (e.g., air interface alignment control agents, polymerization initiators, crosslinking agents, and surfactants), and other optional constituents.

Liquid Crystal Compound

Preferred liquid crystal compounds used to form the cholesteric liquid crystal layer include low-molecular-weight liquid crystal compounds and polymer liquid crystal compounds. More preferred are low-molecular-weight liquid crystal compounds, which require a shorter alignment time and have a higher alignment evenness.

The liquid crystal compound preferably has a polymerizable group. More preferably, the liquid crystal compound exhibits a nematic phase or a chiral smectic phase. The molecular shape is preferably disk-like or rod-like. Rod-like molecules are more preferred from the viewpoint of productivity, whereas disk-like molecules are more preferred when it is important to reduce the angular dependence of the width of selective reflection.

Suitable liquid crystal compounds include rod-like nematic liquid crystal compounds having a polymerizable group or having no polymerizable group. Rod-like nematic liquid crystal compounds having no polymerizable group are described in various documents (e.g., Y. Goto et. al., Mol. Cryst. Liq. Cryst 1995, Vol. 260, pp. 23-28).

Suitable disk-like compounds having a polymerizable group include the compounds described in JP1996-27284A (JP-H8-27284A), JP2001-100028A, and JP2006-76992A. The combined use of two or more polymerizable nematic liquid crystal compounds inhibits crystal precipitation during coating and alignment and decreases the alignment temperature.

The polymerizable group may be introduced into the liquid crystal compound in any known manner. The polymerizable group is not particularly limited and can be appropriately selected according to the purpose. Examples include unsaturated polymerizable groups, an epoxy group, a thioepoxy groups, an oxetane group, a thietanyl group, an aziridinyl group, a pyrrole group, a fumarate group, a cinnamoyl group, an isocyanate group, an isothiocyanate group, an amino group, a hydroxyl group, a carboxyl group, an alkoxysilyl group, a mercapto group, a vinyl group, an allyl group, a methacryloyl group, and an acryloyl group.

For example, when the liquid crystal compound is a polymerizable nematic liquid crystal compound, the polymerizable group is preferably at least one of an unsaturated polymerizable group, an epoxy group, or an aziridinyl group, more preferably an unsaturated polymerizable group, particularly preferably an ethylenically unsaturated polymerizable group.

These polymerizable groups may be used alone or in combination of two or more.

Chiral Agent

The chiral agent (chiral compound (optically active compound)) used for the cholesteric liquid crystal composition may be any known chiral agent. For example, compounds described in "Liquid Crystal Device Handbook, Chapter 3, Section 4-3, Chiral Agents for TN and STN, p. 199, edited by the 142nd Committee of the Japan Society for the Promotion of Science, 1989", isosorbide derivative, and isomannide derivative can be used.

While chiral agents typically include an asymmetric carbon atom, axially chiral compounds and planarly chiral compounds, which include no asymmetric carbon atom, can also be used.

Examples of axially chiral compounds and planarly chiral compounds include binaphthyls, helicenes, paracyclophanes, and derivatives thereof.

The chiral compound for inducing a helical structure in the cholesteric liquid crystalline phase is preferably selected according to the purpose since the helical sense or helical pitch to be induced varies depending on the compound. The sense and pitch of a helix can be measured by using methods described in "Ekisho Kagaku Jikken Nywnon (Introduction to Experimental Liquid Crystal Science", edited by The Japanese Liquid Crystal Society, published by Sigma Publishing, 2007, p. 46 and "Ekisho Binran (Liquid Crystal Handbook)", the Editorial Committee of Ekisho Binran, Maruzen, p. 196.

The chiral agent may have a polymerizable group.

When the chiral agent has a polymerizable group, for example, a polymer having a nematic liquid crystal repeating unit and an optically active structure can be formed by the polymerization reaction of a polymerizable nematic liquid crystal compound.

The polymerizable group of the chiral agent is preferably a group similar to the polymerizable group of the liquid crystal compound. Thus, when the liquid crystal compound is a polymerizable nematic liquid crystal compound, the polymerizable group of the chiral agent is also preferably at least one selected from the group consisting of unsaturated polymerizable groups, an epoxy group, and an aziridinyl group, more preferably an unsaturated polymerizable group, particular preferably an ethylenically unsaturated polymerizable group.

The chiral agent may also have a photoisomerizable group.

When the chiral agent has a photoisomerizable group, a pattern of the desired reflection wavelength corresponding to the emission wavelength of the light sources 14 can be advantageously formed by irradiation with, for example, active radiation through a photomask after coating and alignment. Preferred photoisomerizable groups include isomerizable moieties of photochromic compounds, an azo group, an azoxy group, and a cinnamoyl group. Specific compounds include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent based on the liquid crystal compound is preferably 0.01 to 200 mol %, more preferably 1 to 30 mol %.

Polymerization Initiator

It is preferable to add a polymerization initiator for a polymerization reaction to the cholesteric liquid crystal composition. Polymerization reactions include thermal polymerization reactions with thermal polymerization initiators and photopolymerization reactions with photopolymerization initiators. Of these, photopolymerization reactions with photopolymerization initiators are particularly preferred.

The photopolymerization initiator is not particularly limited and can be appropriately selected according to the purpose. Examples include α-carbonyl compounds, acyloin ethers, α-hydrocarbon-substituted aromatic acyloin compounds, polynuclear quinone compounds, combinations of triarylimidazole dimers and p-aminophenyl ketones, oxadiazole compounds, halomethylated triazine derivatives, halomethylated oxadiazole derivatives, imidazole derivatives, anthraquinone derivatives, benzanthrone derivatives, benzophenone derivatives, thioxanthone derivatives, acridine derivatives, phenazine derivatives, and oxime derivatives.

The content of the photopolymerization initiator based on the solids content of the cholesteric liquid crystal composition is preferably 0.01 to 20 mass %, more preferably 0.5 to 5 mass %.

Crosslinking Agent

The cholesteric liquid crystal composition may optionally contain a crosslinking agent to achieve improved film hardness and durability after curing. Crosslinking agents that cure with, for example, ultraviolet light, heat, or moisture are suitable for use.

The crosslinking agent is not particularly limited and can be appropriately selected according to the purpose. Examples include polyfunctional acrylate compounds such as trimethylolpropane tri(meth)acrylate and pentaerythritol tri(meth)acrylate; epoxy compounds such as glycidyl (meth) acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanates, polyoxazoline compounds having oxazoline side groups; and alkoxysilane compounds such as vinyltrimethoxysilane and N-(2-aminoethyl)-3-aminopropyltrimethoxysilane. Known catalysts may also be used depending on the reactivity of the crosslinking agent to achieve improved productivity in addition to improved film hardness and durability. These crosslinking agents may be used alone or in combination of two or more.

The content of the crosslinking agent is preferably 3 to 20 mass %, more preferably 5 to 15 mass %. When the content of the crosslinking agent is 3 mass % or more, the crosslink density improving effect can be sufficiently produced, and when the content of the crosslinking agent is 20 mass % or less, the stability of the cholesteric liquid crystal layer can be secured.

Air Interface Alignment Control Agent

An air interface alignment control agent, which contributes to stable or quick formation of a planarly aligned cholesteric liquid crystal layer, may be added to the cholesteric liquid crystal composition.

Examples of air interface alignment control agents include fluorine-containing (meth)acrylate polymers and below-described compounds represented by general formula (1). Two or more air interface alignment control agents selected from the group consisting of these compounds may be contained.

These air interface alignment control agents reduce the tilt angle of the liquid crystal compound molecules at the air interface of the cholesteric liquid crystal layer or allow them to be substantially horizontally aligned. In the present invention, "horizontally aligned" means that the major axes of the liquid crystal molecules are parallel to the film plane; however, they need not be exactly parallel. In the present invention, this phrase means that the liquid crystal molecules are aligned at a tilt angle of less than 20° with respect to the horizontal plane.

When the liquid crystal compound is horizontally aligned near the air interface, orientation defects are less likely to occur. Thus, the cholesteric liquid crystal layer exhibits high transparency outside the effective wavelength range (selective reflection range) and a high degree of polarization in the effective wavelength range. In contrast, if the liquid crystal compound molecules are aligned at a large tilt angle, the helical axis of the cholesteric liquid crystalline phase would deviate from the normal to the film plane. This is undesirable because the reflectance would decrease, and the degree of polarization would also decrease due to the occurrence of a fingerprint pattern and the resulting increase in haze and diffraction.

Examples of fluorine-containing (meth)acrylate polymers usable as air interface alignment control agents include compounds described in, for example, paragraphs <0018> to <0043> of JP2007-272185A.

As described above, compounds represented by general formula (1) below are also suitable for use as air interface alignment control agents.

Hereinafter, compounds usable as air interface alignment control agents and represented by general formula (1) below will be described.

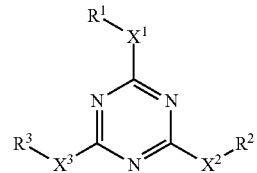

general formula (1)

In general formula (1), $R^1$, $R^2$, and $R^3$ each independently represent a hydrogen atom or a substituent, and $X^1$, $X^2$, and $X^3$ each represent a single bond or a divalent linking group. Preferred substituents represented by $R^1$ to $R^3$ are substituted or unsubstituted alkyl groups (in particular, unsubstituted alkyl groups and fluorine-substituted alkyl groups are more preferred), substituted or unsubstituted aryl groups (in particular, aryl groups having fluorine-substituted alkyl groups are preferred), substituted or unsubstituted amino groups, substituted or unsubstituted alkoxy groups, substituted or unsubstituted alkylthio groups, and halogen atoms. The divalent linking groups represented by $X^1$, and $X^3$ are preferably selected from the group consisting of alkylene groups, alkenylene groups, divalent aromatic groups, divalent heterocyclic residues, —CO—, —NRa- (where Ra is an alkyl group having 1 to 5 carbon atoms or a hydrogen atom). —O—, —S—, —SO—. —SO$_2$—, and combinations thereof. More preferred are divalent linking groups selected from the group consisting of alkylene groups, phenylene groups. —CO—, —NRa-. —O—, —S— and —SO$_2$— and combinations of at least two divalent linking groups selected from this group. The number of carbon atoms in the alkylene groups is preferably 1 to 12. The number of carbon atoms in the alkenylene groups is preferably 2 to 12. The number of carbon atoms in the divalent aromatic groups is preferably 6 to 10.

Examples of compounds represented by general formula (1) and usable as air interface alignment control agents include compounds described in JP2005-99248A. Compounds represented by general formula (1) may be used alone or in combination of two or more as air interface alignment control agents.

The amount of a compound represented by general formula (1) added to the cholesteric liquid crystal composition is preferably 0.01 to 10 mass %, more preferably 0.01 to 5 mass %, particularly preferably 0.02 to 1 mass %, based on the total mass of the cholesteric liquid crystal compound.

Surfactant

As will be described later, the reflective-type circularly polarizing plate 18 having a cholesteric liquid crystal layer is formed by applying to a substrate a cholesteric liquid crystal composition containing a polymerization initiator and a polymerizable liquid crystal compound, drying the coating, and polymerizing (crosslinking or curing) the liquid crystal compound.

Here, to adjust the surface tension of the coating obtained by applying the cholesteric liquid crystal composition to the substrate to achieve uniform thickness, the cholesteric liquid crystal composition preferably contains a surfactant.

A surfactant that does not interfere with alignment can be appropriately selected and used.

Examples of suitable surfactants that can be used include nonionic surfactants containing a siloxane group and/or a fluoroalkyl group as a hydrophobic moiety. Particularly suitable are oligomers having two or more hydrophobic moieties per molecule.

Commercially available surfactants may also be used. Examples of commercially available surfactants include PolyFox PF-151N, PF-636, PF-6320, PF-656, PF-6520, PF-3320, PF-651, and PF-652 available from OMNOVA Solutions Inc.; FTERGENT FTX-209F, FTX-208G, and FTX-204D available from NEOS Company Limited; and SURFLON KH-40 available from Seimi Chemical Co., Ltd. Also suitable are fluorinated compounds described in paragraphs <0087> to <0088> of JP2002-341126A and fluorinated compounds described in paragraphs <0064> to <0080> and paragraphs <0092> to <0096> of JP2005-99248A.

The content of the surfactant is preferably 0.01 to 1 mass % of the solids content of the cholesteric liquid crystal composition. If the content of the surfactant is less than 0.01 mass %, orientation defects may occur since the surface tension at the air interface does not decrease sufficiently. If the content of the surfactant is more than 1 mass %, excess surfactant may form an uneven structure on the air interface side, thus decreasing the alignment evenness.

Solvent

The solvent used for the preparation of the cholesteric liquid crystal composition is not particularly limited and can be appropriately selected according to the purpose, and an organic solvent is preferably used.

The organic solvent is not particularly limited and can be appropriately selected according to the purpose. Examples include ketones, alkyl halides, amides, sulfoxides, heterocyclic compounds, hydrocarbons, esters, and ethers. These may be used alone or in combination of two or more. Of these, ketones are particularly preferred in view of environmental impact.

As described above, the cholesteric liquid crystal layer can be formed using a cholesteric liquid crystal composition prepared by dissolving, for example, a liquid crystal compound, a chiral agent, and a polymerization initiator in a solvent.

For example, a cholesteric liquid crystal layer with fixed cholesteric regularity (cholesteric phase) can be formed by preparing a cholesteric liquid crystal composition, applying the cholesteric liquid crystal composition to an alignment film on the support 30 (layer forming surface), drying the cholesteric liquid crystal composition to obtain a coating, optionally drying the coating, then aligning the liquid crystal compound, and irradiating the coating having the liquid crystal compound aligned therein with active radiation to polymerize the liquid crystal compound. That is to say, the circularly polarized light reflecting layer 32 having a cholesteric liquid crystal layer can be fabricated by this method.

A laminated film composed of a plurality of cholesteric liquid crystal layers can be formed by repeating the process of producing a cholesteric liquid crystal layer.

The alignment film may be formed on the surface of the support 30 by a known method.

Examples of the method include rubbing treatment of an organic compound or a polymer (e.g., a resin such as polyimide, polyvinyl alcohol, polyester, polyarylate, polyamide-imide, polyetherimide, polyamide, or modified polyamide), oblique deposition of an inorganic compound, formation of a layer having microgrooves, and accumulation of an organic compound (e.g., ω-tricosanoic acid, dioctadecylmethylammonium chloride, or methyl stearate) by the Langmuir-Blodgett technique (LB film). Also known are alignment films that exhibit an alignment function upon application of an electric or magnetic field or irradiation with light.

Of these, alignment films formed by rubbing treatment of a polymer are particularly preferred. The rubbing treatment can be performed by rubbing the surface of the polymer layer with paper and/or cloth several times in a predetermined direction.

Alternatively, the support 30 may be subjected to rubbing treatment or the like so that the support 30 acts as an alignment film.

The method of applying the cholesteric liquid crystal composition to the alignment film is not particularly limited and can be appropriately selected according to the purpose.

Examples of the method include curtain coating, extrusion coating, direct gravure coating, die coating, spin coating, dip coating, spray coating, and slide coating. Alternatively, a cholesteric liquid crystal composition applied to a support may be transferred to the alignment film.

After the application of the cholesteric liquid crystal composition, the applied cholesteric liquid crystal composition is heated to align the liquid crystal compound. The heating temperature is preferably 200° C. or lower, more preferably 130° C. or lower. This alignment treatment provides an optical thin film in which a liquid crystal compound such as a polymerizable nematic liquid crystal compound is twistedly aligned so as to have a helical axis in a direction substantially perpendicular to the plane of the optical thin film.

As described above, after the liquid crystal compound is aligned, the liquid crystal composition is polymerized.

The polymerization may be performed by a known method such as thermal polymerization or photopolymerization, depending on the liquid crystal compound. Photopolymerization with light irradiation is preferred to thermal polymerization. The light irradiation is preferably performed using ultraviolet light. The irradiation energy is preferably 20 mJ/cm$^2$ to 50 J/cm$^2$, more preferably 100 to 1,500 mJ/cm$^2$. To promote the photopolymerization reaction, the light irradiation may be performed under heating conditions or in a nitrogen atmosphere. The ultraviolet light used for irradiation preferably has a wavelength of 350 to 430 nm. A higher degree of polymerization reaction is preferred from the viewpoint of stability. The degree of polymerization reaction is preferably 70% or more, more preferably 80% or more.

The degree of polymerization reaction can be determined from the proportion of consumed polymerizable functional groups using an infrared (IR) absorption spectrum.

In the circularly polarized light reflecting layer 32 having a cholesteric liquid crystal layer, the thickness of the cholesteric liquid crystal layer is not limited, and is preferably 0.1 to 50 μm, more preferably 0.5 to 10 μm, still more preferably 1.5 to 7 μm.

(2) Circularly Polarized Light Reflecting Layer Composed of Reflective-Type Linear Polarizing Plate and λ/4 Plate As described above, a circularly polarized light reflecting layer 32 composed of a reflective-type linear polarizing plate and a λ/4 plate can also be used.

Reflective-Type Linear Polarizing Plate

Examples of reflective-type linear polarizing plates include (I) reflective-type linear polarizing plates having a multilayer structure, (II) polarizers composed of a stack of thin films with different birefringence, (Hi) wire grid polarizers, (IV) polarizing prisms, and (V) polarizing plates with scattering anisotropy.

Examples of (I) reflective-type linear polarizing plates having a multilayer structure include those composed of a stack of a plurality of dielectric thin films with different refractive indices.

To provide a wavelength-selective reflective film corresponding to a reflective-type circularly polarizing plate having an effective wavelength range, it is preferable to alternately stack one or more dielectric thin films having a high refractive index and one or more dielectric thin films having a low refractive index. However, the number of types of dielectric thin films is not limited to two, and more than two types of dielectric thin films may be stacked.

The number of stacked layers is preferably 2 to 20, more preferably 2 to 12, still more preferably 4 to 10, particularly preferably 6 to 8. If the number of stacked layers is more than 20, the production efficiency decreases due to multilayer deposition, which may make it impossible to achieve the objects and advantageous effects of the present invention.

The order of stacking of dielectric thin films is not limited and can be appropriately selected according to the purpose. For example, when the refractive index of an adjacent film is high, a film having a lower refractive index than the adjacent film is stacked first. In contrast, when the refractive index of an adjacent layer is low, a film having a higher refractive index than the adjacent film is stacked first. The boundary between high and low refractive indices is 1.8. Whether the refractive index is high or low is not absolute. There may be included in materials having high refractive indices a material having a relatively high refractive index and a material having a relatively low refractive index, and these may be alternately used.

Examples of materials for dielectric thin films with high refractive indices include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, SiO, $Ta_2O_5$, $TiO_2$, TlCl, $Y_2O_3$, ZnSe, ZnS, and $ZrO_2$. Of these, $B_2O_3$, $CeO_2$, $CeF_3$, $HFO_2$, SiO, $Ta_2O_5$, $TiO_2$, $Y_2O_3$, ZnSe, ZnS, and $ZrO_2$ are preferred. Of these, SiO, $Ta_2O_5$, $TiO_2$, $Y_2O_3$, ZnSe, ZnS, and $ZrO_2$ are particularly preferred.

Examples of materials for dielectric thin films with low refractive indices include $Al_2O_3$, $BiF_3$, $CaF_2$, $LaF_3$, $PbCl_2$, $PbF_2$, LiF, $MgF_2$, $NdF_3$, $SiO_2$, $Si_2O_3$, NaF, $ThO_2$, and $ThF_4$. Of these, $Al_2O_3$, $BiF_3$, $CaF_2$, $MgF_2$, MgO, $SiO_2$, and $Si_2O_3$ are preferred, and $Al_2O_3$, $CaF_2$, $MgF_2$, MgO, $SiO_2$, and $Si_2O_3$ are particularly preferred.

The atomic ratio of the materials for the dielectric thin films is not particularly limited and can be appropriately selected according to the purpose. The atomic ratio can be adjusted by varying the atmospheric gas concentration during deposition.

The method of forming the dielectric thin films is not limited and can be appropriately selected according to the purpose. Examples of the method include vacuum vapor deposition methods such as ion plating and ion beam deposition, physical vapor deposition (PVD) methods such as sputtering, and chemical vapor deposition (CVD) methods. Of these, vacuum vapor deposition and sputtering are preferred, and sputtering is particularly preferred.

A preferred sputtering method is direct-current (DC) sputtering, which provides a deposition rate. In DC sputtering, it is preferable to use materials with high conductivity.

Examples of the method of forming a multilayer film by a sputtering method include (1) a single chamber method in which films are formed from different targets alternately or sequentially in a single chamber and (2) a multi-chamber method in which films are continuously formed in multiple chambers. Of these, the multi-chamber method is particularly preferred from the viewpoint of productivity and prevention of material contamination.

The thickness of the dielectric thin films is preferably $\lambda/16$ to $\lambda$, more preferably $\lambda/8$ to $3\lambda/4$, still more preferably $\lambda/6$ to $3\lambda/8$, on the order of optical wavelengths.

Light propagating through the deposited dielectric layer is partially reflected multiple times by each dielectric thin film. The reflected light interferes, and only light with a wavelength determined by the product of the thickness of the dielectric thin films and the refractive index of the films for the light is selectively transmitted. In addition, the central transmission wavelength of the deposited dielectric layer has an angular dependence on incident light; therefore, the transmission wavelength can be changed by varying the incident light.

Examples of (II) polarizers composed of a stack of thin films with different birefringence include those described in JP1997-506837A (JP-H9-506837A).

Specifically, such a polarizer can be formed using a wide variety of materials through processing under conditions selected to achieve a refractive index relationship. In general, one of first materials needs to have a refractive index different from that of a second material in a selected direction. This difference in refractive index can be achieved by various methods including stretching during or after film formation, extrusion molding, and coating. In addition, the two materials preferably have similar rheological properties (e.g., melt viscosity) so that they can be coextruded.

Commercially available polarizers composed of a stack of thin films with different birefringence may also be used. Examples of such commercially available polarizers include those marketed under the trade name DBEF by 3M Company.

(III) Wire grid polarizers are polarizers that transmit one polarized component and reflect another polarized component by the birefringence of thin metal wires.

Wire grid polarizers, which have a periodic array of metal wires, are mainly used as polarizers in the terahertz range. For a wire grid to function as a polarizer, it is necessary to have a wire pitch sufficiently smaller than the wavelength of incident electromagnetic radiation.

A wire grid polarizer has metal wires arranged at regular intervals. A wire grid polarizer reflects a component polarized parallel to the longitudinal direction of the metal wires and transmits a component polarized perpendicular to the longitudinal direction of the metal wires.

Commercially available wire grid polarizers may also be used. Examples of commercially available wire grid polarizers include 50×50 and NT46-636 wire grid polarizing filters manufactured by Edmund Optics, Inc.

By adjusting the reflection wavelength range for linearly polarized light of the reflective-type linear polarizing plate, a reflective-type circularly polarizing plate having an effective wavelength range can be fabricated.

The wavelength range of the linearly polarized light to be reflected may be adjusted by known techniques, such as adjusting the wire grid pitch of a wire grid polarizer, adjusting the aspect ratio of the sectional shape of a polarizer, and selecting the material for forming a polarizer.

λ/4 Plate

The λ/4 plate is not limited, and various known λ/4 plates can be used. Examples include stretched polycarbonate films, stretched norbornene polymer films, aligned transparent films containing birefringent inorganic particles such as strontium carbonate, and thin films obtained by oblique vapor deposition of inorganic dielectrics on supports.

Examples of λ/4 plates include (1) retardation plates including a birefringent film with large retardation and a birefringent film with small retardation that are stacked on top of each other such that their optical axes are orthogonal to each other, as described in JP1993-27118A (JP-H5-27118A) and JP1993-27119A (JP-H5-27119A), (2) a retardation plate in which a polymer film that acts as a λ/4 plate at a particular wavelength and a polymer film that is made of the same material and acts as a λ/2 plate at the particular wavelength are stacked on top of each other to thereby provide a λ/4 wavelength in a wide wavelength range, as described in JP1998-68816A (JP-H10-68816A), (3) a retardation plate in which two polymer films are stacked on top of each other to thereby achieve a λ/4 wavelength in a wide wavelength range, as described in JP1998-90521A (JP-H10-90521A), (4) a retardation plate that includes a modified polycarbonate film and achieves a quarter wavelength in a wide range of wavelengths, as described in WO00/26705A, and (5) a retardation plate that includes a cellulose acetate film and achieves a λ/4 wavelength in a wavelength range, as described in WO00/65384A.

Commercially available λ/4 plates may also be used. Examples of commercially available λ/4 plates include the trade name PURE-ACE WR (manufactured by Teijin Limited).

In the reflective-type circularly polarizing plate 18 according to the present invention, the circularly polarized light reflecting layer 32 may be a circularly polarized light reflecting layer having a cholesteric liquid crystal layer or a circularly polarized light reflecting layer composed of a reflective-type linear polarizing plate and a λ/4 plate, either of which is suitable for use. In particular, the circularly polarized light reflecting layer 32 having a cholesteric liquid crystal layer is suitable for use because light emitted from the light source 14 can be effectively used without waste.

That is to say, when circularly polarized light is reflected from an ordinary reflective surface, the rotational direction (sense) is reversed. That is to say, when right-handed circularly polarized light is reflected, it converts into left-handed circularly polarized light, and when left-handed circularly polarized light is reflected, it converts into right-handed circularly polarized light. Thus, if light emitted from the light source 14 has a rotational direction that causes reflection when incident on the cholesteric liquid crystal layer, the rotational direction is reversed upon reflection from the inner surface of the housing 24 and eventually becomes a rotational direction that allows transmission through the cholesteric liquid crystal layer, as a result of which the light enters and passes through the cholesteric liquid crystal layer, Consequently, the circularly polarized light reflecting layer 32 having the cholesteric liquid crystal layer allows the light emitted from the light source 14 to be effectively used without waste.

As described above, the circularly polarized light reflecting layer 32 of the reflective-type circularly polarizing plate 18 has an effective wavelength range, and reflects left-handed circularly polarized light in the effective wavelength range and transmits right-handed circularly polarized light, or reflects right-handed circularly polarized light in the effective wavelength range and transmits left-handed circularly polarized light. Alternatively, the circularly polarized light reflecting layer 32 reflects right-handed circularly polarized light and transmits the other light. All the light outside the effective wavelength range is transmitted.

As with the light source 14, the effective wavelength range (center wavelength) of the circularly polarized light reflecting layer 32 may be appropriately selected according to the target plant for the plant growth lighting fixture 10.

In general, irradiation with red light and irradiation with blue light are suitable for the promotion of growth (weight increase) of plants. Thus, for the promotion of plant growth, irradiation with red right-handed circularly polarized light or left-handed circularly polarized light or irradiation with blue right-handed circularly polarized light or left-handed circularly polarized light are preferred.

Thus, the circularly polarized light reflecting layer 32 preferably has a center wavelength of a particular wavelength range where right-handed circularly polarized light or left-handed circularly polarized light is selectively reflected, that is, an effective wavelength range, in the wavelength range of 380 to 500 nm or the wavelength range of 600 to 780 nm.

The effective-wavelength-range center wavelength of the circularly polarized light reflecting layer 32 is a wavelength at which the reflectance of right-handed circularly polarized light or left-handed circularly polarized light is highest in the effective wavelength range, that is, a wavelength at which the transmittance of right-handed circularly polarized light or left-handed circularly polarized light is lowest in the effective wavelength range.

The effective wavelength range of the circularly polarized light reflecting layer 32, that is, the reflective-type circularly polarizing plate 18, can be measured, for example, with AxoScan mentioned above.

Here, to suitably promote plant growth, it is preferable to select a light source 14 having a center wavelength that is most effective for plant growth.

Thus, it is preferred that the effective-wavelength-range center wavelength match the center wavelength of the light source 14 so that the reflective-type circularly polarizing plate 18 most properly reflects left-handed circularly polarized light or right-handed circularly polarized light and transmits the other circularly polarized component at the center wavelength of the light source 14.

As described above, the circularly polarized light reflecting layer 32 is bonded to the support 30 with the adhesive layer 34 interposed therebetween.

The adhesive layer 34 is not limited, and any known adhesive can be used as long as it sufficiently transmits light emitted from the light source 14 and can bond together the support 30 and the circularly polarized light reflecting layer 32 with sufficient adhesive strength according to the support 30 and the circularly polarized light reflecting layer 32.

Examples of adhesives usable for the adhesive layer 34 include various known adhesives such as silicone adhesives, acrylic adhesives, natural rubber adhesives, synthetic rubber adhesives, cycloolefin resin adhesives, urethane adhesives, and epoxy adhesives, which are used to bond various sheet-like materials used in optical applications, such as protective films (protective sheets), gas barrier films, and optical films, to target places.

Here, the reflective-type circularly polarizing plate 18 can be mounted to the lighting fixture main body 12 upside down, as described above. Thus, when the reflective-type circularly polarizing plate 18 is mounted to the lighting fixture main body 12 with the support 30 facing outward, as with the support 30, the light in the effective wavelength range becomes right-handed circularly polarized light or left-handed circularly polarized light transmitted through the circularly polarized light reflecting layer 32.

Thus, if the adhesive layer 34 has a large in-plane retardation Re in this case, as with the support 30, the degree of circular polarization of the light in the effective wavelength range transmitted through the reflective-type circularly polarizing plate 18 may decrease, thus reducing the plant growth promoting effect.

In view of this, it is preferable to use, for the adhesive layer 34, an adhesive having a small in-plane retardation Re, such as an optical clear adhesive (OCA).

Specifically, the adhesive layer 34 has an in-plane retardation Re (550) at 550 nm of preferably 50 nm or less, more preferably 10 nm or less.

The thickness of the adhesive layer 34 is not limited, and a thickness that can provide sufficient adhesion may be appropriately set according to the type of adhesive for forming the adhesive layer 34.

The thickness of the adhesive layer 34 is preferably 1 to 100 μm, more preferably 10 to 30 μm.

The reflective-type circularly polarizing plate 18 having the support 30, the circularly polarized light reflecting layer 32, and the adhesive layer 34 may be formed, for example, by release transfer.

Specifically, the circularly polarized light reflecting layer 32 is formed on an appropriately selected substrate as described above. An alignment film as described above is optionally formed in advance on the surface of the substrate. The substrate may be a resin film such as a PET film.

Next, an uncured adhesive layer 34 is formed on a surface of the support 30 and/or the circularly polarized light reflecting layer 32, and the support 30 and the circularly polarized light reflecting layer 32 are affixed to each other with the uncured adhesive layer 34 interposed therebetween.

After this, the adhesive layer 34 is cured, and then the substrate is peeled off to form the reflective-type circularly polarizing plate 18. Here, the substrate, such as a PET film, may be left unpeeled on the reflective-type circularly polarizing plate if the plant growth lighting fixture 10 can be used without any problem.

In the plant growth lighting fixture 10 according to the present invention, the circularly polarized light reflecting layer plate may have any other configuration.

For example, the reflective-type circularly polarizing plate may have a configuration iii which the circularly polarized light reflecting layer 32 is directly formed, without the adhesive layer 34, on the support 30 or an alignment film formed on the support 30.

As described above, in the plant growth lighting fixture 10 according to the present invention, the reflective-type circularly polarizing plate 18 having such a configuration is detachably mounted to the lighting fixture main body 12 by insertion of the transverse end portions into the grooves (long recesses) formed by the light-transmitting plate 26 and the holding members 28 that are substantially L-shaped in section and movement (sliding) in the longitudinal direction.

Due to this configuration, e plant growth lighting fixture 10 according to the present invention is usable for the growth promotion of a plurality of plants that are irradiated with different types of circularly polarized light for growth promotion, and, furthermore, the reflective-type circularly polarizing plate alone can be replaced when the reflective-type circularly polarizing plate is deteriorated.

A plant growth lighting fixture having a light source and a reflective-type circularly polarizing plate as described in, for example, JP2012-226229A can suitably promote plant growth by irradiating a plant with circularly polarized light having a wavelength (color) and a rotational direction that enable the promotion of plant growth.

Here, the variety of plants is wide. Thus, wavelength ranges of light that enable growth promotion vary. Furthermore, even when light of the same wavelength range (color) is used, the growth of some plants is promoted by right-handed circularly polarized light, and the growth of other plants is promoted by left-handed circularly polarized light.

Plant growth lighting fixtures of the related art do not consider these points and thus are not usable for the growth promotion of plants that are irradiated with different types of circularly polarized light for growth promotion. Thus, when circularly polarized light that promotes the growth of a plant to be cultivated cannot be radiated, the plant growth lighting fixture needs to be replaced.

As described in JP2012-226229A, in a plant growth lighting fixture having a light source and a respective-type circularly polarizing plate, an LED is suitably used as the light source. As is well known, LEDs have a long operating life, and thus the reflective-type circularly polarizing plate formed using a resin or the like deteriorates faster than the LED. In addition, the reflective-type circularly polarizing plate is basically a film and thus may be damaged and deteriorated, for example, by mechanical impact.

Plant growth lighting fixtures of the related art also do not consider this point, and if the reflective-type circularly polarizing plate is deteriorated, the plant growth lighting fixture, including the undeteriorated LED and other members, needs to be replaced.

In contrast, in the plant growth lighting fixture 10 according to the present invention, the reflective-type circularly polarizing plate 18 is detachably mounted to the lighting fixture main body 12 with the main surface of the plate facing the light-transmitting plate 26 serving as the light exit surface of the lighting fixture main body.

Thus, when the plant growth lighting fixture 10 according to the present invention is used, plants whose growth can be promoted with different types of circularly polarized light can be cultivated by providing a plurality of reflective-type circularly polarizing plates that reflect different types of circularly polarized light.

For example, when a light source 14 that emits blue light is used, a reflective-type circularly polarizing plate 18 that has an effective wavelength range in the wavelength range of blue light and reflects right-handed circularly polarized light and a reflective-type circularly polarizing plate 18 that has an effective wavelength range in the wavelength range of blue light and reflects left-handed circularly polarized light are provided, and the reflective-type circularly polarizing plates 18 are changed according to the plant to be cultivated, whereby the growth of plants whose growth can be promoted with blue light, including plants whose growth can be promoted with left-handed circularly polarized light and plants whose growth can be promoted with right-handed circularly polarized light, can be promoted.

The plants whose growth can be promoted with blue light (380 to 500 nm) include, for example, plants whose growth can be more suitably promoted with light with a shorter wavelength, that is, near 380 nm, and plants whose growth can be promoted more suitably with light with a longer wavelength, that is, near 500 nm. Also in this case, for example, a reflective-type circularly polarizing plate 18 having an effective-wavelength-range center wavelength near 380 nm and a reflective-type circularly polarizing plate 18 having an effective-wavelength-range center wavelength near 500 nm are provided, and the reflective-type circularly polarizing plates 18 are changed according to the plant to be cultivated, whereby the growth of plants whose growth can be promoted with right-handed or left-handed circularly polarized light near 380 nm and the growth of plants whose growth can be promoted with right-handed or left-handed circularly polarized light near 500 nm can be promoted.

Furthermore, when a white light source is used as the light source 14 as described above, a reflective-type circularly polarizing plate 18 having an effective wavelength range in the wavelength range of blue light, a reflective-type circularly polarizing plate 18 having an effective wavelength range in the wavelength range of green light, and a reflective-type circularly polarizing plate 18 having an effective wavelength range in the wavelength range of red light are provided.

The reflective-type circularly polarizing plates 18 are changed according to the plant to be cultivated, whereby the growth of any plants including plants whose growth can be promoted with blue light, plants whose growth can be promoted with green light, and plants whose growth can be promoted with red light can be promoted.

In addition, when the plant growth lighting fixture 10 according to the present invention is used, if the reflective-type circularly polarizing plate 18 is deteriorated due to, for example, impact damage and using and aging deterioration, it is only required that the deteriorated reflective-type circularly polarizing plate 18 be pulled out and removed to replace the reflective-type circularly polarizing plate 18 alone.

Thus, the LED and other members still having a sufficient operating life are not wasted, and the cost of plant cultivation using the plant growth lighting fixture 10 can be reduced. In particular, when a plurality of light sources 14 are provided to cover a large area as in the plant growth lighting fixture 10 in the illustrated example, this effect is significant.

In the plant growth lighting fixture 10 according to the present invention, the length of the reflective-type circularly polarizing plate 18 is not limited, and, for example, a length sufficient to cover the entire light-transmitting region of the light-transmitting plate 26 may be appropriately set according to the size of the plant growth lighting fixture 10. The length of the reflective-type circularly polarizing plate 18 is a length of the long side of the main surface of the rectangle of the reflective-type circularly polarizing plate 18.

The longitudinal length of the reflective-type circularly polarizing plate 18 is preferably 2 m or less, more preferably 1.5 m or less.

When the longitudinal length of the reflective-type circularly polarizing plate 18 is 2 m or less, benefits such as preventing bending from occurring when the plate is mounted to the lighting fixture main body 12, preventing the reflective-type circularly polarizing plate 18 from becoming unnecessarily heavy, improving handleability, e.g., ensuring good attachability to and detachability from the lighting fixture main body 12, and reducing the processing cost are provided.

The longitudinal length of the reflective-type circularly polarizing plate 18 is preferably 1 m or more. The reflective-type circularly polarizing plate 18 having a longitudinal length of 1 in or more enables plant growth promotion over a large area.

In the plant growth lighting fixture 10 according to the present invention, the aspect ratio of the reflective-type circularly polarizing plate 18 is also not limited and may be appropriately determined according to the size of the plant growth lighting fixture 10.

For the same reason as for the longitudinal length of the reflective-type circularly polarizing plate 18 described above, the aspect ratio of the reflective-type circularly polarizing plate 18 is preferably 5 to 200 in a longitudinal direction/transverse direction ratio.

The shape of the main surface of the reflective-type circularly polarizing plate 18 is typically rectangular. However, depending on the shape of the lighting fixture main body, the main surface of the reflective-type circularly polarizing plate 18 may be oval, trapezoidal, polygonal, e.g., triangular or hexagonal but not square, or of indeterminate shape.

In this case, the longitudinal length of the reflective-type circularly polarizing plate 18 may be defined as the length of the long side of an imaginary minimum rectangle including the main surface of the reflective-type circularly polarizing plate 18, and the transverse length of the reflective-type circularly polarizing plate 18 may be defined as the length of the short side of the imaginary minimum rectangle.

In the plant growth lighting fixture 10 according to the present invention, as illustrated in FIG. 1 to FIG. 3, in a state where the reflective-type circularly polarizing plate 18 is mounted to the lighting fixture main body 12, a space S (see FIG. 3) is preferably left between the reflective-type circularly polarizing plate 18 and the light exit surface of the lighting fixture main body 12 that is, the light-transmitting plate 26.

If the space S is left between the reflective-type circularly polarizing plate 18 and the light-transmitting plate 26 in the state where the reflective-type circularly polarizing plate 18 is mounted to the lighting fixture main body 12, when the reflective-type circularly polarizing plate 18 is mounted to the lighting fixture main body 12 and when the reflective-type circularly polarizing plate 18 is detached from the lighting fixture main body 12, sliding contact between the reflective-type circularly polarizing plate 18 and the light-transmitting plate 26 is prevented, thus allowing the reflective-type circularly polarizing plate 18 to be attached to and detached from the lighting fixture main body 12 smoothly and without damaging the reflective-type circularly polarizing plate 18.

Furthermore, if the space S is left between the reflective-type circularly polarizing plate 18 and the light-transmitting plate 26 in the state where the reflective-type circularly polarizing plate 18 is mounted to the lighting fixture main body 12, an air layer constituted by the space S serves as a heat-insulating layer. Thus, the presence of the space S can reduce deterioration of the reflective-type circularly polarizing plate 18, particularly, the circularly polarized light reflecting layer 32 due to heat from the light source 14 to provide the reflective-type circularly polarizing plate 18 with a longer life.

The height of the space S is not limited, and a height that allows the reflective-type circularly polarizing plate 18 to be smoothly attached and detached and provides good heat insulation may be appropriately set according to, for example, the size of the plant growth lighting fixture 10, the type of the light source 14, and the material forming the circularly polarized light reflecting layer 32.

The height of the space S is preferably 0.1 mm or more, more preferably 1 mm or more.

The height of the space S is preferably 10 mm or less, because, for example, the plant growth lighting fixture 10 can be prevented from becoming unnecessarily large.

In the plant growth lighting fixture according to present invention, detachable mounting of the reflective-type circularly polarizing plate 18 using the grooves provided in the lighting fixture main body 12 need not necessarily be performed by insertion of the opposite transverse end portions into the grooves. That is to say, the plant growth lighting fixture according to the present invention may be configured such that the reflective-type circularly polarizing plate 18 is detachably mounted to the lighting fixture main body 12 by insertion of opposite longitudinal end portions of the reflective-type circularly polarizing plate 18 into grooves provided in the lighting fixture main body 12.

However, the configuration in which the opposite transverse end portions of the reflective-type circularly polarizing plate 18 are inserted into the grooves provided in the lighting fixture main body 12 as in the illustrated example is preferred because the reflective-type circularly polarizing plate 18 can be suitably prevented from bending when mounted to the lighting fixture main body 12.

In the plant growth lighting fixture according to present invention, the method of detachably mounting the reflective-type circularly polarizing plate to the lighting fixture main body is not limited to the insertion of the opposite end portions of the reflective-type circularly polarizing plate into the grooves provided in the lighting fixture main body 12 as in the illustrated example. That is to say, in the plant growth lighting fixture according to present invention, the reflective-type circularly polarizing plate can be detachably mounted to the lighting fixture main body by known means such as fitting of a protrusion into a recess, the use of a fixing jig such as a clamp, fastening with a screw, or a bolt and a nut.

Preferably, the reflective-type circularly polarizing plate is detachably mounted to the lighting fixture main body by insertion of the opposite end portions of the reflective-type circularly polarizing plate into the grooves provided in the lighting fixture main body 12 as in the illustrated example, because, for example, the above space S is easily provided, the reflective-type circularly polarizing plate can be readily attached and detached, and bending of the reflective-type circularly polarizing plate can be suitably prevented.

In the plant growth lighting fixture according to present invention, the light source and the circularly polarized light reflecting layer of the reflective-type circularly polarizing plate are each not limited to be of one type.

That is to say, the plant growth lighting fixture according to the present invention may have a plurality of types of light sources 14 that emit light in wavelength ranges (with center wavelengths) different from each other and a reflective-type circularly polarizing plate including a plurality of types of circularly polarized light reflecting layers having effective wavelength ranges (center wavelengths) corresponding to the wavelength ranges in which the light sources 14 emit light.

Figure 4:
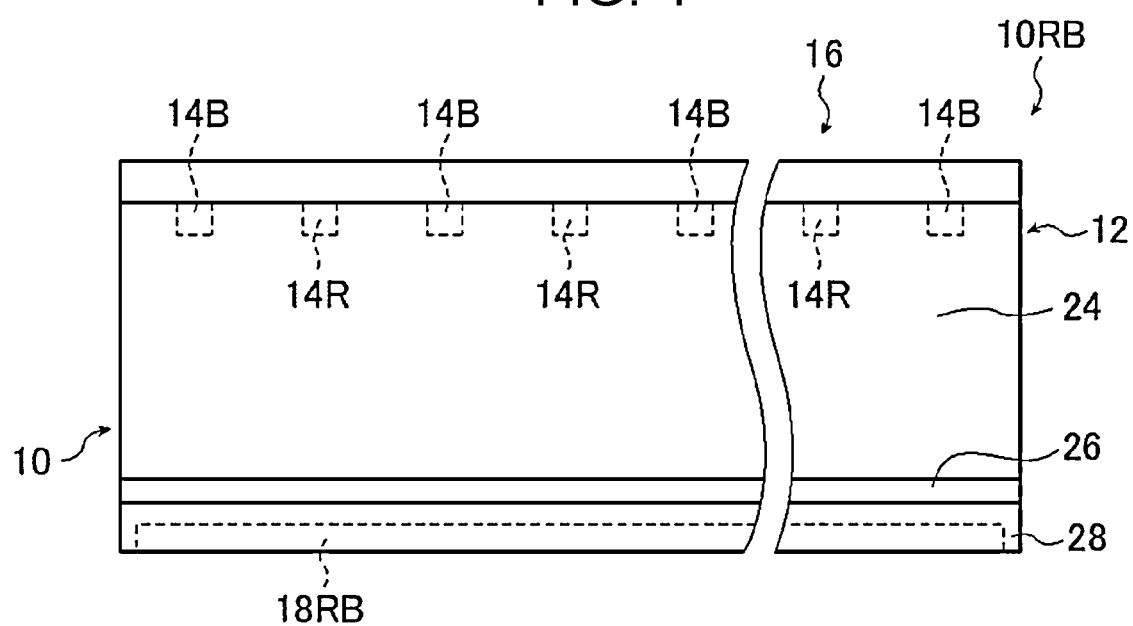
FIG. 4 conceptually illustrates another example of a plant growth lighting fixture according to the present invention.

FIG. 4 conceptually illustrates an example thereof. In a plant growth lighting fixture 10RB illustrated in FIG. 4 and a reflective-type circularly polarizing plate 18RB illustrated in FIG. 5 described below, several members are the same as used in the plant growth lighting fixture 10 and the reflective-type circularly polarizing plate 18 described above. Thus, the same members are denoted by the same reference numerals, and in the following, different parts will be mainly described.

As illustrated in FIG. 4, the plant growth lighting fixture 10RB has a red light source 14R that emits red light and a blue light source 14B that emits blue light, and the red light source 14R and the blue light source 14B are alternately arranged in the longitudinal direction of the housing 24.

The red light source 14R and the blue light source 14B need not necessarily be alternately arranged one by one. When the red light source 14R is denoted by R. and the blue light source 14B is denoted by B, the light sources may be arranged, for example, in a configuration in which two or more and two or more are alternately arranged, such as a configuration in which two and two are alternately arranged like RRBBRRBBRR . . . or a configuration in which three and three are alternately arranged like RRRBBBRRRBBB . . . .

When the plant growth lighting fixture according to the present invention has a plurality of types of light sources, the numbers of the light sources may be the same or different.

Figure 5:
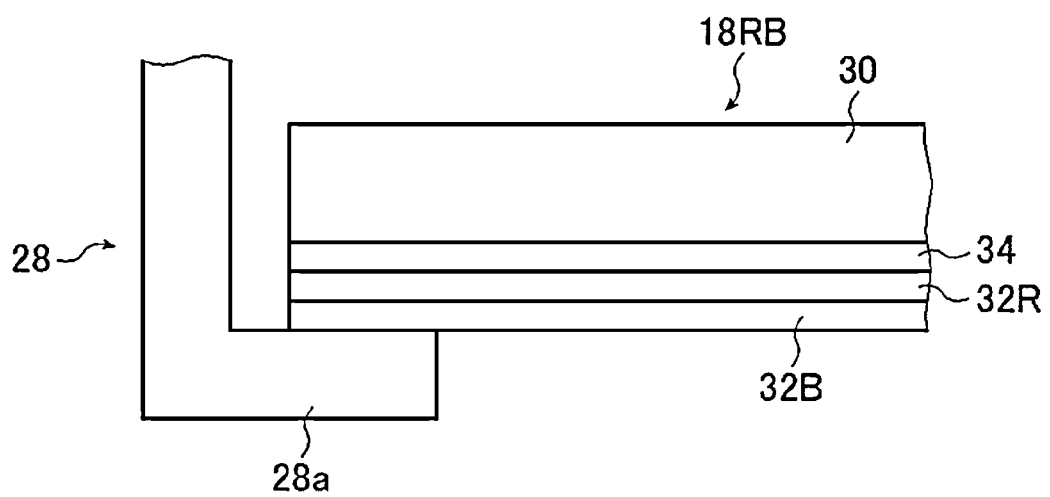
FIG. 5 conceptually illustrates another example of a reflective-type circularly polarizing plate used for a plant growth lighting fixture according to the present invention.

The plant growth lighting fixture 10RB has the reflective-type circularly polarizing plate 18RB. FIG. 5 conceptually illustrates the reflective-type circularly polarizing plate 18RB.

The reflective-type circularly polarizing plate 18RB has, on one surface of the support 30, a red circularly polarized light reflecting layer 32R that has an effective wavelength range (center wavelength) in the wavelength range of red light and reflects left-handed circularly polarized light or right-handed circularly polarized light and a blue circularly polarized light reflecting layer 32B that has an effective wavelength range (center wavelength) in the wavelength range of blue light and reflects left-handed circularly polarized light or right-handed circularly polarized light.

The red circularly polarized light reflecting layer 32R and the blue circularly polarized light reflecting layer 32B are bonded to the support 30 with the adhesive layer 34 interposed therebetween. If necessary, the red circularly polarized light reflecting layer 32R and the blue circularly polarized light reflecting layer 32B may be bonded to each other with the same adhesive layer interposed therebetween.

When the red light source 14R and blue light source 14B, and the red circularly polarized light reflecting layer 32R and the blue circularly polarized light reflecting layer 32B are present as described above, plant growth can be promoted with different two types of circularly polarized light.

For example, when the red circularly polarized light reflecting layer 32R and the blue circularly polarized light reflecting layer 32B of the reflective-type circularly polarizing plate 18RB both reflect right-handed circularly polarized light, the plant growth lighting fixture 10RB can promote, by switching on the red light source 14R, the growth of a plant whose growth can be promoted by irradiation with red left-handed circularly polarized light and can promote, by switching on the blue light source 14B, the growth of a plant whose growth can be promoted by irradiation with blue left-handed circularly polarized light. That is to say, according to this configuration, the growth of plants that are irradiated with different types of circularly polarized light for growth promotion can be promoted by changing the light source switched on.

For example, when the red circularly polarized light reflecting layer 32R and the blue circularly polarized light reflecting layer 32B of the reflective-type circularly polarizing plate 18RB both reflect left-handed circularly polarized light, the plant growth lighting fixture 10RB can promote the growth of plants that are irradiated with different types of circularly polarized light for growth promotion, that is, a plant whose growth can be promoted by red right-handed circularly polarized light and a plant whose growth can be promoted by blue right-handed circularly polarized light, depending on the light source switched on.

Moreover, the plant growth lighting fixture according to the present invention is configured such that the reflective-type circularly polarizing plate is detachably mounted to the lighting fixture main body 12, and can be used while changing different reflective-type circularly polarizing plates, as described above. Thus, when the plant growth lighting fixture according to the present invention has a plurality of types of light sources, and a plurality of reflective-type circularly polarizing plates each having a plurality of circularly polarized light reflecting layers are provided, plant growth can be promoted with a wider variety of types of circularly polarized light.

For example, in the plant growth lighting fixture 10RB having the red light source 14R and the blue light source 14B in the illustrated example, two reflective-type circularly polarizing plates, that is, a reflective-type circularly polarizing plate 18RB in which the red circularly polarized light reflecting layer 32R and the blue circularly polarized light reflecting layer 32B both reflect right-handed circularly polarized light and a reflective-type circularly polarizing plate 18RB in which the red circularly polarized light reflecting layer 32R and the blue circularly polarized light reflecting layer 32B both reflect left-handed circularly polarized light, are provided.

With this configuration, the plant growth lighting fixture 10RB, by changing the reflective-type circularly polarizing plates 18RB and further changing the light source switched on depending on the plant to be cultivated, can promote the growth of plants that are irradiated with four different types of circularly polarized light for growth promotion, that is, a plant whose growth can be promoted by red left-handed circularly polarized light, a plant whose growth can be promoted by blue left-handed circularly polarized light, a plant whose growth can be promoted by red right-handed circularly polarized light, and a plant whose growth can be promoted by blue right-handed circularly polarized light.

In the plant growth lighting fixture according to present invention, when the reflective-type circularly polarizing plate has two circularly polarized light reflecting layers having effective wavelength ranges different from each other, the combination of rotational directions (senses) of circularly polarized light reflected by the circularly polarized light reflecting layers is not limited, and any combination can be used.

For example, when the reflective-type circularly polarizing plate has a red circularly polarized light reflecting layer and a blue circularly polarized light reflecting layer as described above, not only the above-described two types of reflective-type circularly polarizing plates each having a combination of circularly polarized light reflecting layers that reflect circularly polarized light having the same rotational direction, a reflective-type circularly polarizing plate having a red circularly polarized light reflecting layer 32R that reflects right-handed circularly polarized light and a blue circularly polarized light reflecting layer 32B that reflects left-handed circularly polarized light and a reflective-type circularly polarizing plate having a red circularly polarized light reflecting layer 32R that reflects left-handed circularly polarized light and a blue circularly polarized light reflecting layer 32B that reflects right-handed circularly polarized light can also be used.

The plant growth lighting fixture 10RB according to the present invention may have only one of the above-described four types of reflective-type circularly polarizing plates each having a red circularly polarized light reflecting layer 32R and a blue circularly polarized light reflecting layer 32B, appropriately selected two or three, or all the four types of reflective-type circularly polarizing plates.

When the plant growth lighting fixture according to present invention has two light sources having different emission wavelengths (center wavelengths) and the reflective-type circularly polarizing plate has two circularly polarized light reflecting layers having different effective wavelength ranges (center wavelengths), the types of light emitted from the light sources and the effective wavelength ranges of the circularly polarized light reflecting layers are not limited to red light and blue light, and various types of light and any combination of various types of light can be used.

For example, the types of light emitted from the light sources and the effective wavelength ranges of the circularly polarized light reflecting layers may be red light and green light, green light and blue light, or a combination of visible light and invisible light, such as the combination of blue light and infrared light.

In the plant growth lighting fixture according to present invention, the light sources and the circularly polarized light reflecting layers of the reflective-type circularly polarizing plate are not limited to the two types in the illustrated example, and three or more types of light sources and circularly polarized light reflecting layers may be used as long as the emission wavelength of each light source and the effective wavelength range of each circularly polarized light reflecting layer correspond to each other.

For example, the plant growth lighting fixture may be configured to have a red light source, a green light source, and a blue light source and a circularly polarized light reflecting layer having an effective wavelength range in the wavelength range of red light, a circularly polarized light reflecting layer having an effective wavelength range in the wavelength range of green light, and a circularly polarized light reflecting layer having an effective wavelength range in the wavelength range of blue light.

This allows the plant growth lighting fixture to be used for the growth promotion of a wider variety of plants.

In an embodiment where the plant growth lighting fixture has three or more types of light sources and a reflective-type circularly polarizing plate having three or more types of circularly polarized light reflecting layers, the combination of colors, the combination of rotational directions of circularly polarized light reflected by the circularly polarized light reflecting layers, and the like may be any combination as in the above-described embodiment where the plant growth lighting fixture has two types of light sources and two types of circularly polarized light reflecting layers.

As described above, the plant growth lighting fixture 10 according to the present invention promotes plant growth by irradiating a plant with right-handed circularly polarized light or left-handed circularly polarized light in a wavelength range effective for the promotion of plant growth. Here, the mechanism concerning the plant growth lighting fixture 10 according to the present invention is presumably as follows.

Photoreceptors such as phytochromes, cryptochromes, phototropins, and ZEITLUPE (ZTL), which are involved in, for example, the flower-bud formation promotion, inhibition, and growth control of plants, contain the chromophores phytochromobilin and flavin, which serve as chiral agents and thus exhibit absorption dichroism for circularly polarized light in and around the light absorption wavelength range. That is to say, the photoreceptors more easily absorb either left-handed or right-handed circularly polarized light and less easily absorb circularly polarized light of opposite sense; therefore, it is difficult to induce the function of the photoreceptors by irradiation with circularly polarized light of opposite sense. Thus, it is probable that irradiation with either left-handed or right-handed circularly polarized light alone causes the phenomenon where the degree of growth varies. However, this absorption dichroism is a phenomenon that can be observed in a solution system on a laboratory level; in practice, it is generally thought that the phenomenon described above does not appear because the polarization state is disturbed as the polarized light is scattered by intracellular substances before reaching the chromophores. Surprisingly, however, it has been found that, according to the present invention, plant growth can be controlled depending on the polarization state of irradiation light even in leaves and stems, where the photoreceptors are present.

Phytochromes, which are involved in plant photoperiodism, are present in the red-light absorbing form, which has a maximum absorption wavelength around 650 nm, or the far-red-light absorbing form, which has a maximum absorption wavelength around 750 nm. Irradiation with light around 650 nm converts the red-light absorbing form into the far-red-light absorbing form, whereas irradiation with light around 750 nm converts the far-red-light absorbing form into the red-light absorbing form. The conversion of the far-red-light absorbing form into the red-light absorbing form also proceeds in dark conditions over time. The amount of far-red-light absorbing form produced by these reactions controls when plants bloom. These reactions can be artificially controlled to control when plants bloom, for example, as in nighttime illumination for the cultivation of plants such as chrysanthemum. If the plant growth lighting fixture 10 according to the present invention is used for such illumination as a light source that emits right-handed circularly polarized light, which is absorbed by phytochromes, only in the absorption wavelength range of phytochromes, the required power consumption can be reduced without decreasing the effect of electric illumination.

Since there are various plants and numerous types of chromophores on earth, it is important to change the effective wavelength range where one circularly polarized light is selected and the rotational direction (sense) of the circularly polarized light depending on factors such as the type of plant and/or the purpose of control. It may, of course, be preferred in some cases to simultaneously irradiate plants with circularly polarized light of different senses, for example, right-handed circularly polarized light in one wavelength range and left-handed circularly polarized light in another wavelength range. The plant growth lighting fixture 10 according to the present invention can also be used for such purposes, as described above.

The wavelength range of the circularly polarized light radiated from the plant growth lighting fixture 10 according to the present invention may be changed by replacing the reflective-type circularly polarizing plate 18 depending on the stage of the plant growth cycle, such as dormancy, germination, seedling, cell growth period, or flower-bud differentiation. In addition, irradiation timing, light intensity, polarization state, and other conditions may be adjusted depending on the stage of the diurnal cycle. Furthermore, for example, pulsed light may be used, and light with different polarization states may be used for different parts of the plants to be irradiated. In plant factories, irradiation with light by the plant growth lighting fixture according to the present invention may be combined with humidity, temperature, and gas concentration control.

The target plant for the plant growth lighting fixture 10 according to the present invention is not particularly limited and can be appropriately selected according to the purpose.

Examples of plants include vegetables in the Cucurbitaceae family, the Solanaceae family, the Fabaceae family, the Rosaceae family, the Brassicaceae family, the Asteraceae fancily, the Apiaceae family, the Chenopodiaceae family, the Poaceae family, the Malvaceae family, the Araliaceae family, the Lamiaceae family, the Zingiberaceae family, the Nymphaeaceae family, and the Araceae family; flowering plants for cutting and potting in the Asteraceae family, the Rosaceae family, the Araceae family, the Caryophyllaceae family, the Brassicaceae family, the Plumbaginaceae family, the Gentianaceae family, the Scrophulariaceae family, the Fabaceae family, the Paeoniaceae family, the Iridaceae family, the Solanaceae family, the Amaryllidaceae family, the Orchidaceae family, the Agavaceae family, the Cornaceae, family, the Rubiaceae family, the Salicaceae, family, the Ericaceae family, the Oleaceae family, the Magnoliaceae family, the Primulaceae family, the Begoniaceae family, the Lamiaceae family, the Geraniaceae family, the Crassulaceae the Ranunculaceae family, the Gesneriaceae family, the Cactaceae family, the fern family, the Araliaceae family, the Moraceae family, the Commelinaceae family, the Bromeliaceae family, the Marantaceae family, the Euphorbiaceae family, the Piperaceae family, the Saxifragaceae family, the Onagraceae family, the Malvaceae family, the Myrtaceae family, the Theaceae family, and the Nyctaginaceae family; fruit trees in the Rosaceae family, the Vitaceae family, the Moraceae family, the Ebenaceae family, the Ericaceae family, the Lardizabalaceae family, the Actinidiaceae family, the Passifloraceae family, the Rutaceae family, the Anacardiaceae family, the Bromeliaceae family, and the Myrtaceae family; and algae.

Specific examples include vegetables such as cucumbers, melons, squashes, bitter gourds, zucchinis, watermelons, oriental pickling melons, wax gourds, sponge gourds, spaghetti squashes, tomatoes, green peppers, red peppers, eggplants, pepinos, shishito peppers, peas, green beans, cowpeas, green soybeans, broad beans, winged beans, podded peas, podded green beans, hyacinth beans, strawberries, corn, okra, broccoli, radish sprouts, watercress, komatsuna, tukena, lettuce, giant butterbur, crown daisy, edible chrysanthemum, celery, parsley, mitsuba, seri, regi, wakegi, Chinese chive, asparagus, spinach, saltwort, udo, shiso, ginger, daikon, turnips, wasabi, radishes, rutabaga, kokabu, garlic, rakkyo, root lotus, and taro; flowering plants such as aster, rhodanthe, thistle, dianthus, stock, canola, statice, eustoma, snapdragon, sweet pea, Japanese iris, chrysanthemum, liatris, gerbera, marguerite, gymnaster, Shasta daisy, carnation, baby's-breath, Japanese gentian, Chinese peony, bladder cherry, chelone, dahlia, calla, gladiolus, iris, freesia, tulip, narcissus, amaryllis, cymbidium, dracaena, rose, Japanese quince, cherry blossom, peach, ume, reeves spirea, bramble, Japanese rowan, dogwood, Japanese cornel, Chinese ixora, bouvardia, willow, azalea, forsythia, lily magnolia, cineraria, dimorphotheca, primula, petunia, begonia, Japanese gentian, coleus, geranium, pelargonium, rochea, anthurium, clematis, lily-of-the-valley, saintpaulia, cyclamen, ranunculus, gloxinia, dendrobium, cattleya, phalaenopsis, vanda, epidendrum, oncidium, schlumbergera truncata, schlumbergera russeliana, epiphyllum, kalanchoe, nephrolepis, adiantum, asplenium, pothos, di effenhachia, spathiphyllum, syngonium, spider plant, schefflera, hedera, rubber tree, dracaena, cordyline, bridal veil, ananas, calathea, croton, peperomia, poinsettia, hydrangea, fuchsia, hibiscus, gardenia, manuka, camellia, bougainvillea, and tree peony; fruit trees such as Japanese pears, peaches, cherries, plums, apples, prunes, nectarines, apricots, raspberries, nine, grapes, figs, persimmons, blueberries, chocolate vines, kiwi fruit, passion fruit, loquats, citrus unshiu, murcotts, lemons, yuzu, Buddha's hand, hassaku, pomelos, hanayuzu, kumquats, seminole, iyokan, navel oranges, encore, nova, hyuganatsu, limes, sudachi, kabosu, banpeiyu, tankan, mangoes, pineapples, and guavas; and algae.

Preferred of these are leaf vegetables, particularly komatsuna, which is a type of tukena in the Brassicaceae family.

While the plant growth lighting fixture according to the present invention has been described in detail above, the present invention is not limited to the foregoing example; it should be appreciated that various improvements and modifications may be made without departing from the spirit of the invention.

The present invention is suitable for use in plant cultivation.

REFERENCE SIGNS LIST 10, 10RB plant growth lighting fixture
12 lighting fixture main body
14 light source
16 light source unit
18, 18RB reflective-type circularly polarizing plate
24 housing
24a opening
26 light-transmitting plate
28 holding member
28a lower end portion
30 support
32 circularly polarized light reflecting layer
32R red circularly polarized light reflecting layer
32B blue circularly polarized light reflecting layer
34 adhesive layer

What is claimed is:

1. A plant growth lighting fixture comprising,
a lighting fixture main body having a light exit surface;
a light source held on the lighting fixture main body; and
a reflective-type circularly polarizing plate that selectively reflects circularly polarized light having a particular rotational direction in a particular wavelength range,
wherein the reflective-type circularly polarizing plate has a support and a circularly polarized light reflecting layer held on the support,
the lighting fixture main body has a holding mechanism for detachably mounting the reflective-type circularly polarizing plate with a main surface of the reflective-type circularly polarizing plate facing the light exit surface, and
the holding mechanism has grooves that accommodate two opposite end portions of the reflective-type circularly polarizing plate, and the reflective-type circularly polarizing plate is detachably mounted by inserting the two opposite end portions of the reflective-type circularly polarizing plate into the grooves.

2. The plant growth lighting fixture according to claim 1, wherein the support has an in-plane retardation Re (550) of 50 nm or less.

3. The plant growth lighting fixture according to claim 2, wherein the plant growth lighting fixture includes the light source, the circularly polarized light reflecting layer, and the support, in this order.

4. The plant growth lighting fixture according to claim 1, wherein the circularly polarized light reflecting layer has a cholesteric liquid crystal layer formed by fixing a cholesteric liquid crystalline phase.

5. The plant growth lighting fixture according to claim 1, wherein in a state where the holding mechanism holds the reflective-type circularly polarizing plate, a space is left between the light exit surface of the lighting fixture main body and the reflective-type circularly polarizing plate.

6. The plant growth lighting fixture according to claim 1, wherein the light source includes a plurality of light sources arranged in a single direction.

7. The plant growth lighting fixture according to claim 1, wherein a long side of a minimum rectangle including the main surface of the reflective-type circularly polarizing plate has a length of 1 to 2 m.

8. The plant growth lighting fixture according to claim 1, wherein the support of the reflective-type circularly polarizing plate has a thickness of 0.1 to 5 mm.

9. The plant growth lighting fixture according to claim 1, wherein the reflective-type circularly polarizing plate has a center wavelength of the particular wavelength range, in which circularly polarized light having a particular rotational direction is selectively reflected, in at least one of a wavelength range of 380 to 500 nm or a wavelength range of 600 to 780 nm.

10. The plant growth lighting fixture according to claim 1, wherein the light source is at least one of a light source having an emission center wavelength in a wavelength range of 380 to 500 nm, a light source having an emission center wavelength in a wavelength range of 600 to 780 nm, or a white light source.

11. The plant growth lighting fixture according to claim 1, wherein the light source is an LED.

12. The plant growth lighting fixture according to claim 1, wherein the holding mechanism is an elongated holding member having an L-shaped sectional shape.

* * * * *